(12) United States Patent
Kao et al.

(10) Patent No.: US 9,910,947 B1
(45) Date of Patent: Mar. 6, 2018

(54) METHODS, SYSTEMS, AND ARTICLES OF MANUFACTURE FOR IMPLEMENTING AN ELECTRONIC DESIGN WITH SOLID-FLUID ANALYSIS DRIVEN TECHNIQUES

(71) Applicant: Cadence Design Systems, Inc., San Jose, CA (US)

(72) Inventors: Chun-Teh Kao, Cupertino, CA (US); An-Yu Kuo, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/199,822

(22) Filed: Jun. 30, 2016

(51) Int. Cl.
G06F 17/50 (2006.01)

(52) U.S. Cl.
CPC ...... *G06F 17/5036* (2013.01); *G06F 17/5045* (2013.01)

(58) Field of Classification Search
CPC .................................................. G06F 17/5036
USPC .......................................................... 716/106
See application file for complete search history.

(56) References Cited

U.S. PATENT DOCUMENTS

| | | | |
|---|---|---|---|
| 8,019,580 B1 * | 9/2011 | Chandra | G06F 17/5022 703/13 |
| 9,323,870 B2 * | 4/2016 | Chandra | G06F 17/50 |
| 2012/0139955 A1 * | 6/2012 | Jaffari | G06F 17/5018 345/690 |
| 2012/0323539 A1 * | 12/2012 | Chen | G06F 17/5036 703/2 |
| 2013/0298101 A1 * | 11/2013 | Chandra | G06F 17/50 716/136 |

OTHER PUBLICATIONS

J. H., Whitelaw, "Convective Heat Transfer", 2011.
Andre Bakker, "Lecture 3—Conservation Equations Applied Computational Fluid Dynamics", http://www.bakker.org, 2006.
"18.2 Heat Transfer From a Fin", URL: http://web.mit.edu/16.unified/www/FALL/thermodynamics/notes/node1, Jan. 2008.
"16.4 Thermal Resistance Circuits", URL: http://web.mit.edu/16.unified/www/FALL/thermodynamics/notes/node11, Jan. 2008.
"17.2 Combined Conduction and Convection", URL: http://web.mit.edu/16.unified/www/FALL/thermodynamics/notes/node1, Jan. 2008.
Hauck, Torsten, and Tina Bohm. "Thermal RC-network approach to analyze multichip power packages." Semiconductor Thermal Measurement and Management Symposium, 2000. Sixteenth Annual IEEE. IEEE, 2000.

(Continued)

*Primary Examiner* — Suchin Parihar
(74) *Attorney, Agent, or Firm* — Vista IP Law Group, LLP

(57) ABSTRACT

The described techniques implement electronic designs with thermal analyses of the electronic design and its surrounding medium by performing thermal modeling that determines at least a thermal RC network for an electronic design. These techniques further generate a thermal network for the electronic design and one or more surrounding media of the electronic design and generate or modify the electronic design with an implementation process at least by guiding the implementation process based in part or in whole upon results of performing one or more thermal analysis on the thermal network.

20 Claims, 19 Drawing Sheets

(56) References Cited

OTHER PUBLICATIONS

Schilders, Wil. "Introduction to model order reduction." Model order reduction: theory, research aspects and applications. Springer Berlin Heidelberg, 2008.
Anderson Jr, J. D. "Governing equations of fluid dynamics." Computational fluid dynamics. Springer Berlin Heidelberg, 2009.
"Ansys, Chapter 6, Thermal Analysis", Mar. 29, 2005.
Neale, Adam, et al. "CFD calculation of convective heat transfer coefficients and validation—Part I: Laminar flow." (2006).
D. Roncati, "Iterative calculation of the heat transfer coefficient", Italy, 2013.
"Convective Heat Transfer Convection Equation and Calculator", Engineers Edge, 2000, Accessed on May 19, 2016.
"Convective Heat Transfer", The Engineering ToolBox, URL: http://www.engineeringtoolbox.com/convective-heat-transfer-d_430.html, Accessed on May 19, 2016.
Goddwin, Rd. "Equation of state for thermodynamic properties of fluids." Journal of Research 79 (1975): 71-79.
J.E. Akin, FEA Concepts: SW Simulation Overview, 13 Concepts of Thermal Analysis, 2009.
"Heat capacity", Wikipedia, URL: https://en.wikipedia.org/wiki/Heat_capacity, last modified May 18, 2016.
"AN2008-03: Thermal equivalent circuit models", 2008.
Tan, Sheldon X-D., et al. "A Fast Architecture-Level Thermal Analysis Method for Runtime Thermal Regulation." Journal of Low Power Electronics 4.2 (2008).
Šindler, J., et al. "Krylov Model Order Reduction of a Thermal Subsea Model." World Academy of Science, Engineering and Technology, International Journal of Mechanical, Aerospace, Industrial, Mechatronic and Manufacturing Engineering 7.5 (2013): 842-849.
Lanczos, Cornelius. An iteration method for the solution of the eigenvalue problem of linear differential and integral operators. Los Angeles, CA: United States Governm. Press Office, 1950.
Lassila, Toni, et al. "Model order reduction in fluid dynamics: challenges and perspectives." Reduced Order Methods for modeling and computational reduction. Springer International Publishing, 2014. 235-273.
Bechtold, T., et al. "Krylov-Subspace-Based Order Reduction Methods Applied to Generate Compact-Electro-Thermal Models for MEMS." Proceedings of MSM. 2002.
Wang, Yi, Hongjun Song, and Kapil Pant. "A reduced-order model for whole-chip thermal analysis of microfluidic lab-on-a-chip systems." NIH Public Access, Author Manuscript, 2015.
D. Rowell, "Linear Graph Modeling: One-Port Elements", Massachusetts Institute of Technology Department of Mechanical Engineering, 2.151 Advanced System Dynamics and Control, Jan. 1, 2003.
"Advanced Physical Models", URL: https://web.stanford.edu/class/me469b/handouts/, Jun. 2007.
Stephan, Karl, and A. Laesecke. "The thermal conductivity of fluid air." Journal of physical and chemical reference data 14.1 (1985): 227-234.
M. Marz et al., "Thermal Modeling of Power-electronic Systems" Apr. 2001.
Robert E. Simons, "A Simple Thermal Resistance Model—Isoflux Versus Isothermal", URL: https://www.electronics-cooling.com/2006/02/a-simple-thermal-resistance-model-isoflux-versus-isothermal/, Feb. 2006.

\* cited by examiner 702B  704B  FIG. 7B 702C  704C  FIG. 7C

702D  FIG. 7D

METHODS, SYSTEMS, AND ARTICLES OF MANUFACTURE FOR IMPLEMENTING AN ELECTRONIC DESIGN WITH SOLID-FLUID ANALYSIS DRIVEN TECHNIQUES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

As VLSI technology scales, interconnects are becoming the dominant factor in determining system performance and power dissipation. Interconnect reliability due to electro-migration and electromagnetic interference compliance (EMC) have become serious design issues particularly for long signal lines. In fact, it has been shown that interconnect Joule heating in advanced technology nodes may strongly impact the magnitude of the maximum temperature of the global lines despite negligible changes in chip power density which will, in turn, strongly affect the electro-migration lifetime of the interconnect. In analog designs, unidirectional current flow and smaller wire geometries also raise EM concerns for the signal nets. Behaviors of analog circuits are even more sensitive to layout induced parasitics and thus electro-migration concerns due to the unidirectional current flows in various circuit components. Parasitics not only influence the circuit performance but may often render it non-functional.

In addition to the increasing concerns about electro-migration, voltage drop, also called IR drop, represents another class of challenges for modern electronic circuits. Voltage drop represents the voltage reduction that occurs on power supply networks. The IR drop may be static or dynamic and results from the existence of non-ideal elements—the resistance within the power and ground supply wiring and the capacitance between them. While static voltage drop considers only the average currents, dynamic voltage drop considers current waveforms within clock cycles and has an RC transient behavior. Similar effects may be found in ground wiring, usually referred as ground bounce, whereby current flows back to the ground/$V_{ss}$ pins causing its voltage to fluctuate. Both effects contribute to lower operating voltages within devices (e.g., logic cells/gates in digital circuits), which in general increases the overall time response of a device and might cause operational failures due to heat dissipation.

Conventional steady-state or transient thermal analyses use time consuming time-stepping or domain discretization algorithms such as finite element methods or finite difference methods on discretized designs. Moreover, these conventional steady-state or transient thermal analyses are often after-the-fact in that these analyses are usually performed after electronic designs are completed at, for example, the block level, the chip level, the package level, or even the board level at which integrated circuit blocks are integrated with a printed circuit board. The limitations on the sizes of time-step and the amount of computation time as well as intensive computation have rendered transient thermal analyses less than desired.

The recent advent of mobile communication and computing devices that encapsulate high-powered electronic devices in an enclosed or semi-enclosed enclosure further exacerbates the concerns about heat dissipation and thus emphasizes the importance of correct characterizing the thermal behavior of electronic devices, especially during the early stages of the design cycle. Conventional approaches often adopt the conjugate thermal analysis approach that iterates between the heat transfer equation for the solid (the electronic design) and the differential or partial differential equations of computation fluid dynamics and thus consume large amounts of computational resources in addition to other shortcomings.

Given the advantages provided by various techniques described herein and disadvantages in the conventional approaches, there exists a need for effective and efficient techniques for implementing electronic designs with thermal analyses of the electronic design and the surrounding medium.

SUMMARY

Disclosed are method(s), system(s), and article(s) of manufacture for implementing electronic designs with thermal analyses of the electronic design and its surrounding medium in one or more embodiments. Some embodiments are directed at a method for implementing electronic designs with thermal analyses of the electronic design and the surrounding medium. In some embodiments, thermal modeling that determines at least a thermal RC network may be performed for an electronic design. A thermal network may be generated for the electronic design and one or more surrounding media of the electronic design. The electronic design may be generated or modified with an implementation process at least by guiding the implementation process based in part or in whole upon results of performing one or more thermal analysis on the thermal network.

In some of these embodiments, thermal behaviors of the electronic design and thermal interactions between the electronic design and the one or more surrounding media may be determined at least by performing the one or more thermal analysis on the thermal network. In addition or in the alternative, the thermal RC network of the electronic design may be identified into the thermal network; and a plurality of inputs may be identified for the thermal modeling. In some of these immediately preceding embodiments, the plurality of inputs may comprise at least one of one or more geometric properties, one or more physical properties, one or more thermodynamic properties, one or more boundary conditions, and one or more heat generation sources.

In some embodiments, a thermal load comprising one or more thermal load values into the electronic design may be identified; a first thermal load value may be identified from the thermal load; and thermal solutions for the electronic design may be determined with the first thermal load value at least by analyzing one or more heat transfer mechanisms with the thermal RC network for the electronic design.

In some embodiments, a set of second meshes or elements including a plurality of second nodes may be determined for the one or more surrounding medium. In addition, a set of boundary conditions may be identified for an interface between the electronic design and the one or more surrounding media; and one or more characteristics of a set of the one or more surrounding media may be determined at least by analyzing the fluid flow field in the one or more surrounding medium.

In some of these immediately preceding embodiments, a plurality of first meshes or elements corresponding to the interface may be identified from the set of first meshes or elements; and a plurality of second meshes or elements corresponding to the interface may be identified from the set of second meshes or elements. With the plurality of first and second meshes or elements, equivalent thermal circuit elements for the plurality of second meshes or elements of the one or more surrounding media may be determined based in part or in whole upon the one or more characteristics of the one or more surrounding media; and the thermal network may be updated at least by integrating the equivalent thermal circuit elements with the thermal RC network of the electronic design.

Furthermore, at least one input power profile comprising a plurality of input power values may be identified for the electronic design; and a plurality of boundary conditions may be prescribed on the thermal network. In addition, a first input power value may be identified from the plurality of input power values as a heat source for the thermal network; and at least a first value of a thermal characteristic of the electronic design may be determined at a thermal network solver module for the implementation process at least by analyzing the thermal network with the first input power value and the plurality of boundary conditions in some embodiments.

In some of these immediately preceding embodiments, a second input power value may be identified from the plurality of input power values as the heat source for the thermal network; and at least a second value of the thermal characteristic of the electronic design may be determined for the implementation process at least by analyzing the thermal network with the second input power value and the plurality of boundary conditions. In addition or in the alternative, a mapping may be determined for the at least one input power profile based in part or in whole upon the first input power value and the second input power value; and a derived mapping may be determined for the thermal characteristic of the electronic design based in part or in whole upon the mapping for the at least one input power profile, the first value of the thermal characteristic, and the second value of the thermal characteristic.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 4B-1 illustrates a simplified example of a thermal network generated with various techniques described herein for the electronic design and its surrounding medium illustrated in FIG. 4A in some embodiments.

FIG. 4B-2 illustrates a three-dimensional contour plot of thermal and fluid flow field solutions obtained with a solid-fluid thermal network in some embodiments.

FIG. 7B-1 illustrates an example of transient thermal analysis results in response to the input powers illustrated in FIG. 7B for various components in the electronic design illustrated in FIG. 7A in some embodiments.

FIG. 7C-1 illustrates an example of transient thermal analysis results in response to the input powers illustrated in FIG. 7C for various components in the electronic design illustrated in FIG. 7A in some embodiments.

FIG. 7D-1 illustrates an example of transient thermal analysis results in response to the pulse power input illustrated in FIG. 7D for various components in the electronic design illustrated in FIG. 7A in some embodiments.

FIG. 7E-1 illustrates an example of thermal analysis accuracy comparison between techniques described herein and benchmark numerical techniques in some embodiments.

DETAILED DESCRIPTION

Figure 1:
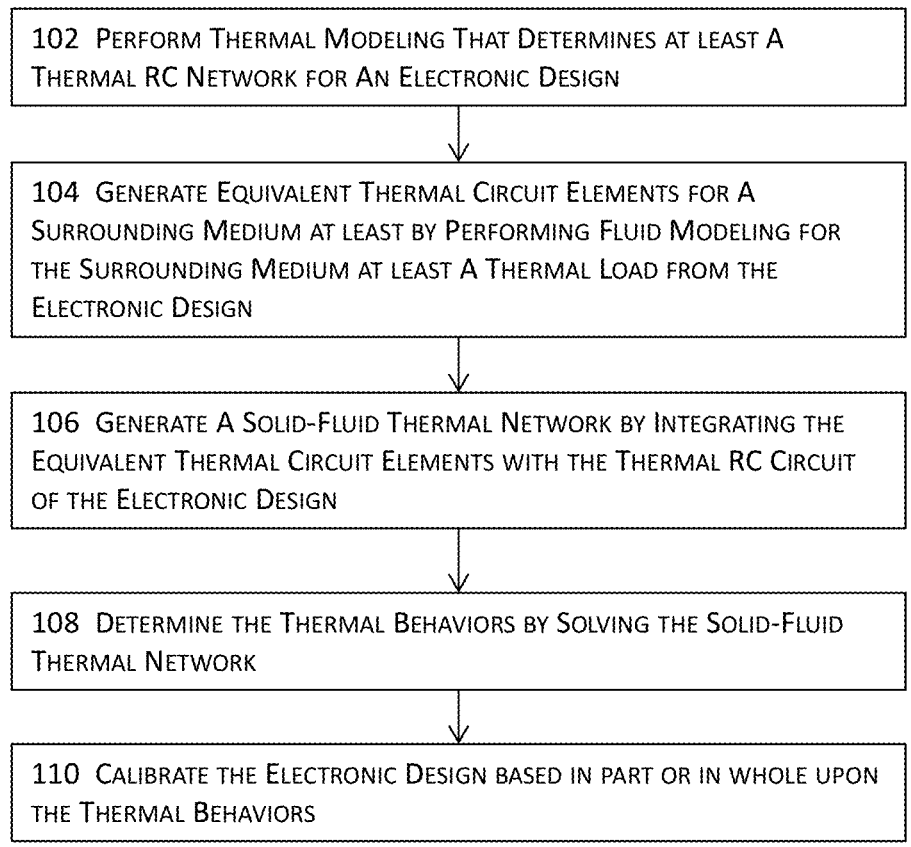
FIG. 1 illustrates a high level block diagram for a method or system for implementing electronic designs with thermal analyses of the electronic design and the surrounding medium in some embodiments.

Various embodiments of the invention are directed to a methods, systems, and articles of manufacture for implementing electronic designs with thermal analyses of the electronic design and the surrounding medium. Other objects, features, and advantages of the invention are described in the detailed description, figures, and claims.

When implementing an electronic design with thermal awareness, various techniques create a thermal network for the electronic design and its surrounding medium, and subsequently analyze the thermal network to determine the thermal behaviors or characteristics of the electronic design within the context of its surrounding medium. More specifically, the electronic design including an integrated circuit (IC) die, the IC packaging, a printed circuit board (PCB), and even a chassis or enclosure may be first discretized into a plurality of meshes or elements that jointly and approximately represent at least the external, geometric shapes of the electronic design. The discretized electronic design may be further analyzed and represented as a thermal RC network including thermally equivalent resistive and/or capacitive elements for the electronic circuit components in the electronic design. The plurality of meshes or elements may be used not only for providing better resolution of detailed analysis results for the electronic design but also for integrating equivalent thermal circuit elements of the surrounding medium with the thermal RC network.

In some embodiments, this thermal RC network is not solved prior to the analysis of the flow field characteristics of the surrounding medium. In addition, the fluid flow field in the surrounding medium may be analyzed at a fluid flow field solver module that solves the fluid flow field in the surrounding medium for thermal parameters or characteristics (e.g., convective heat transfer coefficient, specific enthalpy, specific heat capacity at constant pressure, etc.) that correspond to the plurality of meshes or elements for the electronic design. These thermal parameters or characteristics (collectively thermal parameter for singular or thermal parameters for plural) may be determined by different techniques and may be further converted into equivalent thermal circuit elements (e.g., resistive elements, capacitive elements, etc.) for at least the elements or meshes along the solid-fluid interface between the electronic design and its surrounding medium. These equivalent thermal circuit elements may be integrated with the thermal RC network of the electronic design to generate the thermal network for both the electronic design and its surrounding medium.

Once the thermal RC network for the electronic design and the equivalent thermal circuit elements of its surrounding medium are determined, the thermal network capturing both the electronic design and its surrounding medium may be determined by integrating the equivalent thermal circuit elements of the surrounding medium with the thermal network of the electronic design. Thereafter, various power inputs or heat dissipation from the electronic design may be provided as the heat source for a thermal analysis module that analyzes the thermal network to determine the steady-state or transient thermal solution for the entire thermal network. This thermal solution captures the thermal behaviors of both the electronic design and at least the region of the surrounding medium near or immediately adjacent to the external surfaces of the electronic design. Based on the thermal solution obtained from the thermal network, various parts of the electronic design may be modified to improve the thermal behaviors of the electronic design.

One of the advantages of these techniques described herein is that these techniques capture the interactions (e.g., heat transfer) between the solids (the electronic design) and the surrounding medium with the thermal network, rather than by discretizing the electronic design and the surrounding medium that exhibit great disparity in their respective sizes and thus cause difficulties in discretization and further by solving the governing equations with conventional numerical techniques such as finite element methods, finite difference methods, etc.

Another advantage of these techniques described herein is that, unlike conventional conjugate thermal analysis or conjugate heat transfer, these techniques may entire skip the thermal analysis prior to the completion of the analysis of the fluid flow field. In addition, the analysis of the fluid flow field determines the thermal parameters of the surrounding medium and thus need not necessarily be full-fledged or reduced computational fluid dynamics (CFD) analysis solving the continuity equation, the Navier-Stokes equation, the energy equation, and/or the equations of state (collectively the "field equations").

Another advantage of these techniques described herein is that these techniques provide several different effective ways of handling temporal power inputs (e.g., an input power curve over time for an IC) while balancing the runtime and accuracy requirements. More details about handling temporal power inputs will be described below with reference to FIGS. 2 and 3A-3B.

Another advantage of these techniques described herein is that these techniques provide great scalability, whereas the conventional approaches relying on conjugate thermal analyses or solving heat transfer equation and field equations do not. More details about the scalability of these approaches will be provided below with reference to FIG. 2.

Another advantage of these techniques is that these techniques discretize the electronic design into a plurality of meshes or elements, rather than a single element or mesh for each component in the entire electronic design. In addition, these techniques determine the thermal parameters for the surrounding medium or media, convert the thermal parameters into equivalent thermal circuit elements, and associate an equivalent thermal circuit element with the corresponding surface (e.g., a surface of an element on the exterior of the electronic design) or node of a mesh or element in the plurality of meshes or elements.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1 illustrates a high level block diagram for a method or system for implementing electronic designs with thermal analyses of the electronic design and the surrounding medium in some embodiments. To guide the implementation of an electronic design, thermal modeling may be performed at 102. The output of the thermal modeling process includes the creation of a thermal RC network that governs the thermal behaviors of the electronic design and will subsequently be integrated with the equivalent thermal circuit elements of the surrounding medium to form a solid-fluid thermal network that captures the thermal behaviors of the electronic design and the thermal interactions between the electronic design and its surrounding medium.

It shall be noted that although some embodiments may perform the thermal modeling process to construct a two-dimensional or three-dimensional model to geometrically represent the electronic design and proceed with heat transfer analysis to determine the thermal behaviors or responses, some other embodiments perform the thermal modeling process at 102 to construct a thermal RC network for the electronic design without performing heat transfer analyses or determining thermal behaviors or responses of the electronic design. For example, the thermal modeling process may be performed to determine parameters comprising, for example, the thermal conductivity, heat capacity, etc. to determine the thermal resistances, thermal capacitances, etc. of the electronic design in order to transform the electronic design into a thermal RC network in some embodiments.

To capture the thermal interactions between the electronic design and its surrounding medium, heat generation from the electronic design may be identified as an input to fluid modeling that may be performed at 104 for a surrounding medium of the electronic design. The outputs of the fluid modeling include the computational fluid dynamics results from solving one or more of the field equations in some embodiments. In some other embodiments, the outputs of the fluid modeling include the thermal parameters of the surrounding medium near the interface between the electronic design and its surrounding medium without solving one or even all of the field equations.

For example, the fluid modeling may be performed at 104 to determine the heat transfer coefficients, specific heat capacity at constant pressure, or specific enthalpy of the surrounding medium near the exterior of the electronic design in some embodiments. These thermal parameters of the surrounding medium may be determined by various different techniques including table lookups from libraries, empirical formulae (e.g., empirical formulae between convective heat transfer coefficient and the Nusselt number for different geometric shapes, etc.), computation fluid dynamics analyses, etc.

With the electronic design being discretized into a plurality of meshes or elements, a thermal parameter may be determined for each of the interface meshes or elements that include the meshes or elements that interface with the surrounding medium. These thermal parameters corresponding to these interface meshes or elements may be converted to equivalent thermal circuit elements at 104.

For example, the convective heat transfer coefficient (hi) may be determined for the i-th interface mesh or element, and the convective heat transfer coefficient (hi) may be converted into an equivalent thermal resistor $R_{EQ}$, where $R_{EQ}=1/(hi \times Ai)$, and Ai denotes the surface area of the i-th interface mesh or element interacting with the surrounding medium.

Once these equivalent thermal circuit elements are determined for the interface elements of the electronic design, these equivalent thermal circuit elements may be integrated at 106 with the thermal RC network to form a solid-fluid thermal network that governs both the heat transfer phenomenon with the electronic design and the thermal interactions between the electronic design and its surrounding medium. This solid-fluid thermal network may be provided to a thermal network solver that solves for the steady-state or transient thermal behaviors or responses of the thermal network at 108. The electronic design may thus be calibrated or modified at 110 based in part or in whole upon the thermal behaviors determined at 108 with the solid-fluid thermal network.

Figure 2:
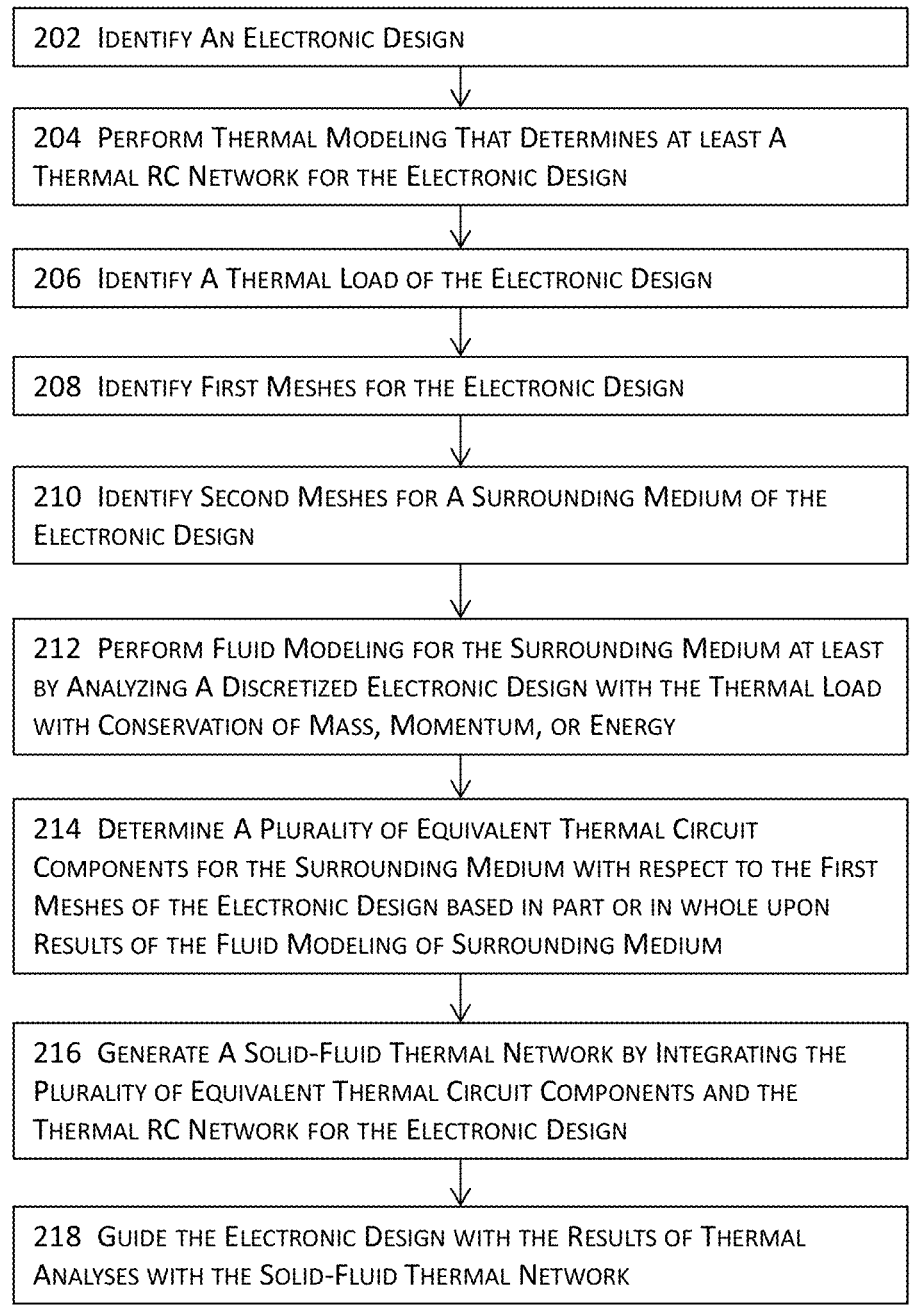
FIG. 2 illustrates a more detailed flow diagram for implementing electronic designs with thermal analyses of the electronic design and the surrounding medium in some embodiments.

FIG. 2 illustrates a more detailed flow diagram for implementing electronic designs with thermal analyses of the electronic design and the surrounding medium in some embodiments. An electronic design of interest may be identified at 202. The electronic design may not necessarily be a complete design and may include, for example, a design specification specifying, for example, the power requirements, the geometric requirements, etc. in some embodiments. In some other embodiments, the electronic design may include a fully routed or even optimized physical electronic design (e.g., a complete or optimized layout). Various techniques described herein apply with full and equal effects to any electronic design from a simple design specification to an optimized layout ready for tape out.

An electronic design includes at least the heat generation component such as an integrated circuit (IC). Nonetheless, an electronic design may include one or more components in addition to an IC. For example, an electronic design may include an IC, the packaging for the IC, a heatsink attached to the IC packaging including the IC and the packaging, the PCB on which the IC packaging is mounted, the chassis or enclosure enclosing the PCB, a server rack or another enclosure enclosing the chassis or enclosure, or even one or more other server racks or enclosures each accommodating one or more chassis or enclosures, etc.

Thermal modeling may be performed at 204. More specifically, the output of the thermal modeling process may include the creation of a thermal RC network. This thermal RC network may be used to characterize the steady-state or transient thermal behaviors of the electronic design in response to an input power. In addition, the thermal RC network may be subsequently integrated with the equivalent thermal circuit elements of the surrounding medium to form a solid-fluid thermal network that captures the thermal behaviors of the electronic design and the thermal interactions between the electronic design and its surrounding medium.

The thermal modeling process for the electronic design may further include discretizing the electronic design into a plurality of meshes or elements with any appropriate meshing or discretization techniques. The plurality of meshes or elements may be further referenced in a fluid flow field analysis that determines the equivalent thermal circuit elements of the surrounding medium. More details about the determination of these equivalent thermal circuit elements of the surrounding medium will be described below with reference to reference numeral 212.

The output of the thermal modeling process may further optionally include other information such as the thermal behaviors of the electronic design in response to an input power with respect to some prescribed boundary conditions. For example, the thermal RC network of the electronic design may be provided to a thermal network solver module to solve for the thermal behaviors of the electronic design in response to an input power. Other types of heat transfer analysis modules may be performed in lieu of the thermal network solver module to obtain, for example, steady-state or transient temperature distributions and/or heat fluxes.

It shall be noted that although some embodiments may perform the thermal modeling process to construct a two-dimensional or three-dimensional model to geometrically represent the electronic design and proceed with heat transfer analysis to determine the thermal behaviors or responses, some other embodiments perform the thermal modeling process at 102 to construct a thermal RC network for the electronic design without performing heat transfer analyses or determining thermal behaviors or responses of the electronic design.

For example, the thermal modeling process may be performed to determine parameters comprising, for example, the thermal conductivity, heat capacity, etc. to determine the thermal resistances, thermal capacitances, etc. of the electronic design in order to transform the electronic design into a thermal RC network in some embodiments. Nonetheless, the thermal behaviors of the electronic design will not be determined prior to the fluid flow field analysis of the surrounding medium in these embodiments because such thermal behaviors may not reflect sufficiently correct thermal responses of the electronic design to the input power without accounting for the heat transfer phenomenon between the electronic design and its surrounding medium. On the other hand, any thermal behaviors determined prior to a fluid flow field analysis may be used as more precise or accurate boundary conditions than randomly prescribed or guesstimated boundary conditions in a subsequent fluid flow field analysis. In some embodiments, whether a heat transfer analysis will be obtained prior to fluid flow field analyses may be determined based on a balance in the consideration of conservation of computational resources and the need for better accuracy.

To capture the heat transfer between the electronic design and its surrounding medium, a thermal load of the electronic design may be identified at 206. This thermal load may include, for example, the input power to the electronic design. An input power to an electronic design may be identified in different formats including, for example, one or more constant values (e.g., minimum power, maximum power, root-mean-square power, etc.), a temporal relation, etc. in some embodiments. This thermal load may be used as the heat generation during the subsequent fluid flow field analyses or analyses of the thermal network.

A first plurality of meshes or elements may be identified at 208 for the electronic design. In some embodiments where the electronic design has been discretized, the first plurality of meshes or elements may be identified from the discretization results. In some other embodiments where the electronic design has not been discretized, the electronic design may be discretized at 208 into the first set of meshes or elements. The first plurality of meshes or elements may be uniform or variable for different circuit components in the electronic design and may be fixed or adaptive depending upon, for example, the rate of changes of one or more thermal characteristics (e.g., temperature, heat fluxes, etc.) of the underlying electronic design. In addition or in the alternative, different components in the electronic design may be discretized into different subsets of meshes or elements having different sizes or shapes in some embodiments or may be discretized with an identical discretization technique to have similar or identical sizes and shapes.

A second plurality of meshes or elements may be identified for the surrounding medium of the electronic design at 210. This second set of plurality of meshes or elements may be subsequently in analyzing the fluid flow field of the surround medium. Similar to the first set of meshes or elements for the electronic design, the second set of meshes or elements may be generated by using any suitable mesh generators or discretization schemes. Also, the second set of meshes may be uniform or non-uniform in the sizes of the meshes or elements and may be fixed or adaptive in sizes and/or locations during a fluid flow field analysis. In some embodiments, the second plurality of meshes or elements may be identified or generated based on the first plurality of meshes or elements for the electronic design.

For example, each first mesh or element in the first plurality of meshes or elements for the electronic design may have a one-to-one correspondence or a one-to-many correspondence with at least some second meshes or elements at or near the interface between the electronic design and the surrounding medium in some embodiments. In these embodiments, the one-to-one correspondence or a one-to-many correspondence may further simplify the determination and integration of the equivalent thermal circuit elements of the surrounding medium with the thermal RC network of the electronic design. For example, with a one-to-one correspondence, the convective heat transfer coefficient of the surrounding fluid may be used to transform the convective heat transfer contribution to a first mesh or element of the electronic design into an equivalent thermal circuit element that may be attached to the corresponding first mesh or element of the electronic design as governed by the one-to-one correspondence without further transformation, interpolation, or extrapolation. More details about transforming thermal parameters into equivalent thermal circuit elements and integrating the equivalent thermal circuit elements with the thermal RC network will be described below with reference to reference numeral 216 and FIG. 3B.

Once the second plurality of meshes or elements is identified, fluid modeling may be performed at 212 for the surrounding medium. In some embodiments, fluid modeling may involve the performance of one or more analysis of the fluid flow field in the surrounding medium. In some embodiments, fluid modeling is performed to determine thermal parameters of the surrounding medium. These thermal parameters may include, for example, convective heat transfer coefficient, thermal conductivity of the surrounding medium, specific enthalpy, etc. and may be determined by using various techniques. For example, various techniques (e.g., numerical methods) may be employed to perform computational fluid dynamics analyses on one or more of the continuity equation (conservation of mass), the Navier-Stokes equation (conservation of momentum), the energy equation (conservation of energy), and the equations of state. Although a CFD solver may be employed to solve these equations to determine various physical and thermodynamic characteristics of the fluid flow field in some embodiments, various assumptions or approximations may also be adopted to simplify the runtime and memory footprint for the fluid modeling.

These assumptions or approximations may include, for example, reduced dimensionality (e.g., from three-dimensional fluid flow field to two- or one-dimensional fluid flow field), the assumption of a high momentum diffusion and low momentum convection flow (e.g., a laminar flow) to directly solve the energy equation, the assumption of incompressible flow (e.g., the flow field with zero divergence of the velocity vector) to decouple the energy equation from the continuity and Navier-Stokes equations, the assumption of irrotational flow (e.g., the flow field with zero curl of the velocity vector) to simplify the fluid flow characteristics from viscosity, the assumption of steady flow (e.g., the flow field with velocity vector independent of time), any combinations thereof, or any other suitable assumptions or approximations in some embodiments.

In some of these embodiments, the entire fluid flow field of the surrounding medium may be divided into a plurality of portions that may be further modeled and analyzed with different assumptions or approximations. Different assumptions or approximations may reduce the complexity and hence the runtime requirement as well as the memory footprint of the fluid modeling. As a result, one or more appropriate assumptions or approximations may be selected based in part or in whole upon one or more criteria including, for example, the physical, electrical, and/or operational characteristic of the electronic design and the flow field of its surrounding medium, a requirement for accuracy, the runtime requirement, etc.

In some embodiments, the fluid modeling is performed to determine thermal parameters without performing CFD analyses to solve one or more of the continuity equation, the Navier-Stokes equation, the energy equation, and the equations of state. For example, the fluid flow field in the surrounding medium of an electronic design may be assumed to be an incompressible flow in some embodiments involving a forced convection (e.g., forced air flow from a cooling device of an enclosure). In this example, the energy equation may be decoupled from the continuity and Navier-Stokes equation, and the thermal parameters may be derived by directly solving the energy equation although this incompressibility assumption may be a better fit for fluid flow field with constant density or fluid flow field with small perturbations in density but may be less desired in embodiments where natural convection is the dominant heat transfer mechanism (e.g., in an enclosure with passive cooling) in the fluid flow field.

In some other embodiments, the thermal parameters may be obtained by, for example, performing a table lookup from engineering resource databases including various parameter values of different flow fields around different geometric objects, interpolation of parameter values from engineering resource databases, directly computation of these parameter values using one or more empirical formulae, etc. For example, the convective heat transfer coefficient may be derived from the Nusselt number (Nu) which is defined as Nu=(h×L)/k, where h is the convective heat transfer coefficient of the flow, L is the characteristic length, and k is the thermal conductivity of the fluid.

The database may include various values of Nusselt number for different fluid flow field around different geometric objects, and the convective heat transfer coefficient for the flow may be derived from these various Nusselt number values in some embodiments. In some other embodiments, the Nusselt number of the flow may be expressed as empirical formulae in terms of the Rayleigh number (Ra) and/or the Prandtl number (Pt) for different flows (e.g., forced convection, free convection, laminar flow, etc.) around different geometric objects (e.g., a vertical wall, a horizontal wall, a pipe, etc.) In these embodiments, the Nusselt number may be determined from one of such empirical formulae, and the convective heat transfer coefficient for the fluid flow may be derived from the determined Nusselt number.

All the other thermal parameters may be similarly determined by computational fluid dynamics solving one or more of the field equations, by simple arithmetic calculations form empirical formulae, or by looking up from one or more databases including tabulated values of these thermal parameters under different conditions and configurations. For example, the thermal conductivity (k(T), T denoting temperature) is generally a tensor of the second order in the three-dimensional space (K(I, j), where i, j={x, y, z}) but may be reduced to a scalar to simplify thermal analyses in some embodiments. The thermal conductivity of a surrounding medium may be determined by computational fluid dynamics solving the aforementioned field equations, by look up in a database, or by simple arithmetic calculations with one or more empirical formulae for different fluid media. For example, the thermal conductivity may be determined form the Bridgman's equation:

$k=3.0 \times (N/V)^{2/3} \times K \times V_s$, where k denotes thermal conductivity; N denotes the Avogadro's number; V denotes the molar volume; K denotes the Boltzmann's constant; and Vs denotes the speed of sound. The modified Bridgman's equation, $k=3.0 \times (N/V)^{2/3} \times K \times V_s$, may also be used to determine the thermal conductivity.

With the thermal parameters determined at 212, a plurality of equivalent thermal circuit elements may be determined at 214 for the surrounding medium with respect to at least some first meshes or elements of the electronic design at or near the interface between the electronic design and its surrounding medium. For example, in some embodiments where the convective heat transfer coefficients (hi) are determined at 212 for the surrounding medium, an equivalent thermal resistors, 1/(hi×Ai) may be determined to be for an i-th first mesh or element having an effective area of Ai of the electronic design. As another example, in some embodiments where thermal conductivity (ki) is determined for the surrounding medium, an equivalent thermal resistor, L/(k×Ai) may be determined for the i-th first mesh or element having an effective area of Ai and a characteristic length L of the electronic design. Equivalent thermal capacitances for the surrounding medium may also be determined with computational fluid dynamics, empirical formulae, or table or database lookup for transient thermal analyses.

Once the equivalent thermal circuit elements are determined for the surrounding medium, a solid-fluid thermal network may be generated at 216 by integrating these equivalent thermal circuit elements of the surrounding medium with the thermal RC network for the electronic design. With the thermal network representing both the electronic design and its surrounding medium, steady-state or transient thermal analyses may be performed at 218 on the solid-fluid thermal network with input power as heat generation as well as appropriate boundary and initial conditions. In some embodiments, these steady-state or transient thermal analyses may be iterated between the electronic design and its surrounding fluid until a convergence criterion is met or an iteration threshold is reached in some embodiments. The results of the steady-state or transient thermal analyses may be used at 218 to guide the implementation, modification, or optimization of the electronic design.

As described above, one of the advantages of these techniques is that these techniques, unlike conventional conjugate thermal analysis or conjugate heat transfer, may entire skip the thermal analysis prior to the completion of the analysis of the fluid flow field. Conjugate thermal analyses are often employed to determine the heating or cooling of a solid object by the flow of the surrounding medium (e.g., air) and thus involve variations of temperature within solids and fluids due to thermal interactions between the solids and fluids. As a result, conjugate thermal analyses are often performed by solving or co-simulating the heat transfer equation for the solids and the continuity equation, the Navier-Stokes equation, and/or the energy equation.

Various modeling techniques have been adopted to simplify the computational intensity of computational fluid dynamics. For example, certain approaches reduce the dimensionality (e.g., from three-dimensional to two-dimensional space) of the problems to reduce the number of variables and equations; some approaches assume an incompressible fluid flow to decouple the Navier-Stokes equation from the energy equation and the continuity equation; and some approaches assume the fluid flow is laminar to directly solve the energy equation; etc.

Nonetheless, although these approaches reduce the computational intensity somewhat, these approaches nevertheless iterate between the solids and fluid flow and are thus impractical, if not entirely impossible to guide the electronic design process, especially in early stages of the electronic design process such as prototyping. In addition, each of these approaches has its own limitations and may thus fall short in providing accurate results for guiding electronic designs. For example, although the incompressibility assumption decouples the energy equation from continuity equation and the Navier-Stokes equation, this approach is nevertheless inadequate for solving natural convention problems that are often the case for mobile communication or computing devices that lack active cooling capabilities and rely almost solely on natural convection for cooling.

With these techniques described herein, one of the outputs of fluid modeling is the convective heat transfer coefficients associated with at least the elements or meshes on the exterior of the electronic design in some embodiments. Therefore, various different solution techniques may be employed to analyze the fluid flow field in the surrounding medium of the electronic design, and some of these solution techniques do not even require solving the continuity equation, the Navier-Stokes equation, energy equation, and/or the equations of state as conventional approaches do.

In addition, these techniques described herein may postpone solving the heat transfer equation until the thermal network capturing the electronic design and its surrounding medium as well as their interactions is built. For steady-state analyses, the thermal network solver module solves for the steady-state thermal solutions with the heat generation input (e.g., input power curves, heat dissipation, etc.) for the electronic design and appropriate initial and boundary conditions in the thermal network to precisely capture the thermal behaviors of both the electronic design and at least the interface elements or meshes of its surrounding medium as well as the interactions in between.

With the thermal network representing the electronic design, its surrounding medium, and their interactions, the overall memory footprint is much less than conventional approaches utilizing conjugate thermal analysis techniques solving the field equations, and the runtime is also substantially reduced due to the use of the thermal network instead of solving the field equations.

These techniques described herein also apply with full and equal effect to transient analyses that iterate between solving the thermal network for thermal behaviors and solving the fluid flow field in the surrounding medium for the parameters (e.g., convective heat transfer coefficient, specific enthalpy, specific heat under constant pressure, etc.) representing the interaction between the electronic design and its surrounding medium. Although iteration through time steps is needed as in every transient analysis, the efficiency and effectiveness of the solution process and the use of the thermal network rather than the conventional heat transfer equation and perhaps one or more of the field equations of the surrounding medium nevertheless provide significant reduction in computational resource utilization.

As described earlier, another advantage of these techniques is that these techniques provide effective ways of handling temporal power inputs while balancing the runtime and accuracy requirements. When a thermal network solver module receives a time-dependent power input as heat generation to solve the thermal network for steady-state or transient thermal behaviors, conventional heat transfer approaches may be forced to run transient heat transfer analyses to accommodate this time-dependent power input.

Although these techniques described herein may also run transient heat analyses on the thermal network to provide higher resolution for the thermal behaviors over time, these techniques may also employ other approaches that consume less computational resources. For example, these techniques may determine a mapping that approximates the input power as provided by the time-dependent input power in some embodiments. These techniques may select a plurality of power values (e.g., the maximum power value, the minimum power value, etc.) from the time-dependent input power or, if the mapping is available, from the mapping approximating the time-dependent input power.

A thermal network solver module may solve the thermal network with each of the selected power values to solve for the corresponding thermal behaviors or responses from the thermal network. The thermal behaviors or responses of the thermal network in response to an unselected input power value may then be approximated with simply arithmetic computations by using at least the mapping without solving the heat transfer problem again. The mapping may be as simple as a constant mapping or a linear mapping over time or may be as complex as a high-order polynomial or other complex functionals. A functional includes a function on a vector space domain and a real-valued range.

In addition, another advantage of these techniques is the greater scalability in handling electronic designs with different complexities and sizes. More specifically, these techniques described herein construct the thermal network that represents the solids and surrounding media. The electronic design is not limited to a single IC die with packaging, and the surrounding media are not limited to the surrounding air around the IC package or PCB. In some embodiments, the electronic design may include one or more IC's and their respective packaging molds (collectively an "IC package" for singular or "IC packages" for plural), a PCB on which these one or more IC packages are mounted, a chassis or enclosure for the PCB and one or more IC packages, a server rack enclosing the chassis or enclosure, etc.

The surrounding media may include the medium enclosed by the chassis or enclosure for the PCB and one or more IC packages, the medium inside the server rack enclosing the chassis or enclosure, the medium outside the server rack in a data center or server farm, etc. These techniques may similarly construct the thermal network by representing the one or more IC packages and PCB as a thermal RC network, adding the equivalent thermal circuit elements of the medium inside the chassis or enclosure to the thermal RC network to form a thermal rack, adding the equivalent thermal circuit elements representing the chassis or enclosure to the thermal network, adding the equivalent thermal circuit elements representing the medium inside the sever rack to the thermal network, adding the equivalent thermal circuit elements representing the server rack to the thermal network, and adding the thermal circuit elements representing the medium outside the sever rack to complete the thermal network.

Figure 3A:
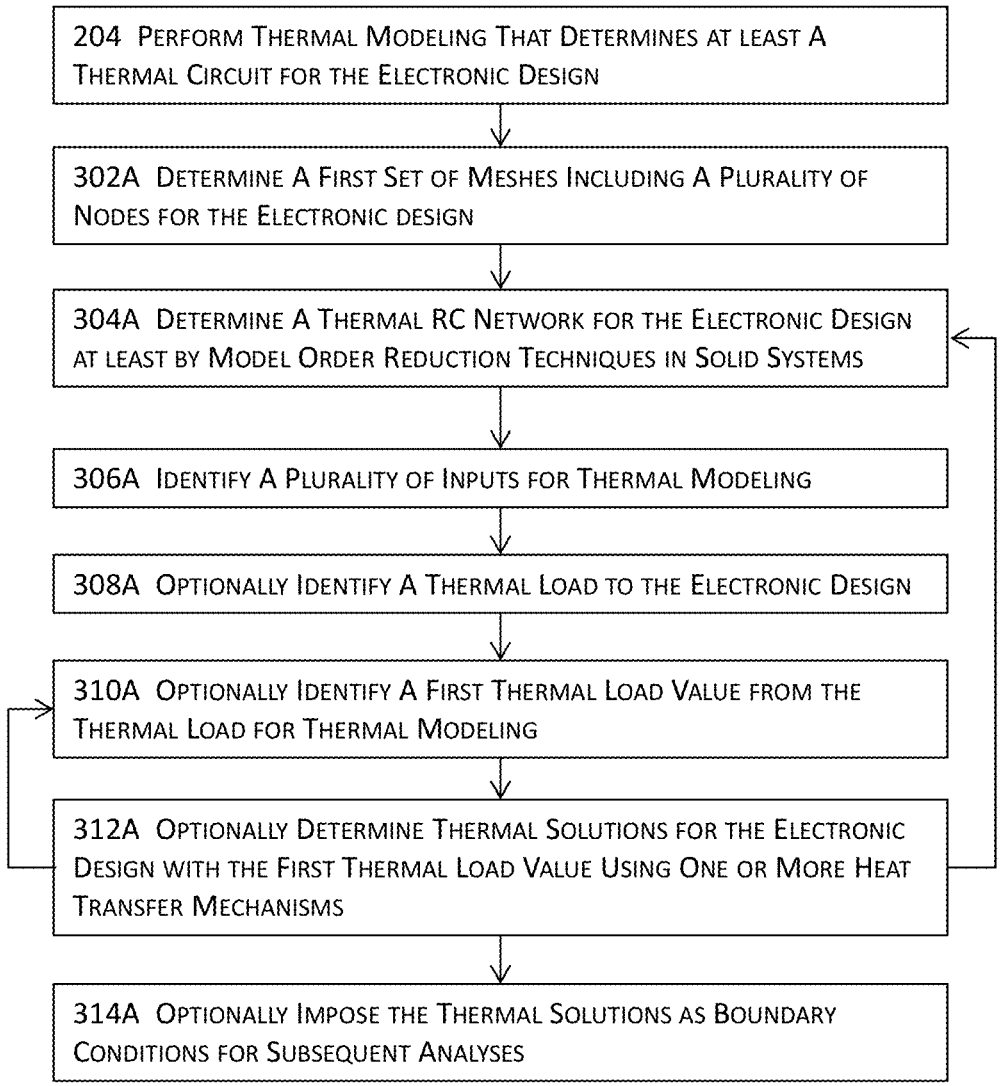
FIG. 3A illustrates a more detailed block diagram for a portion of the block diagram illustrated in FIG. 2 in some embodiments.

FIG. 3A illustrates a more detailed block diagram for a portion of the block diagram illustrated in FIG. 2 in some embodiments. More specifically, FIG. 3A illustrates more details about the thermal modeling performed at 204 of FIG. 2 in some embodiments. A first set of meshes or elements including a plurality of nodes may be determined at 302A for the electronic design. The first set of meshes or elements may be determined for the electronic design by using any appropriate discretization schemes into uniform, non-uniform, fixed, or adaptive sizes or shapes.

In some embodiments, a user or designer may even specify one or more probing points or locations whose thermal behaviors or responses are of particular interest to the user or designer. In addition to providing greater resolution (when compared to having only one element or node for each IC package), the first set of meshes or elements may be referenced subsequently in the fluid flow field analysis to determine the equivalent thermal circuit elements of the surrounding medium.

In these embodiments, these techniques may even accommodate such user specified probing points or locations and include these points or locations in the plurality of meshes or elements. This is in sharp contrast with conventional conjugate thermal analyses that treat each solid component (e.g., an IC package, a PCB, etc.) as a single node or element during the conjugate thermal analyses. The first set of meshes or elements may be uniform or variable for different circuit components in the electronic design and may be fixed or adaptive depending upon, for example, the rate of changes of one or more thermal characteristics (e.g., temperature, heat fluxes, etc.) of the underlying electronic design.

A thermal RC network may be determined at 304A for the electronic design by using any techniques that transform an electronic design or a portion thereof into a corresponding thermal RC network. Various techniques may be used to determine the thermal RC circuit for an electronic design, and some of these techniques may determine the thermal RC circuit by performing one or more thermal or heat transfer analyses, whereas some other embodiments may determine the thermal RC circuit without performing any thermal or heat transfer analyses.

For example, the thermal RC circuit of an electronic design may be determined by performing the thermal modeling by a transmission line equivalent circuit that includes resistive and capacitive elements based on the well-known theory by Kirchhoff that two different forms of energy behave identically when the basic differential equations which described these two different forms of energy have the same form and the initial and boundary conditions are identical. Other suitable techniques may also be used in performing thermal modeling to determine the thermal RC circuit for an electronic design of interest.

In some embodiments, the electronic design may be transformed into the thermal RC network by using model order reduction techniques or projection based reduction techniques that reduce the state space dimension or degrees of freedom by projecting the original thermal model of the electronic design in the original state space into a sub-state space with reduced dimensionality or degrees of freedom while retaining the original inputs and outputs. For example, the Krylov sub-space projection-based model order reduction technique may be used at 304A to determine the thermal RC network for the electronic design. In some embodiments, the thermal RC network may be determined at 304A at least by distributing individual thermal resistors and thermal capacitors to individual layers (e.g., the chip layer, the chip solder layer, the substrate layer, the substrate solder layer, the base plate layer, etc.) of the electronic design and by transforming the thermal analysis into a thermal impedance equation.

In some embodiments, the thermal RC network for the electronic design may or may not be solved prior to the fluid modeling that determines the fluid flow field characteristics of the surrounding medium. In some embodiments, this thermal RC network may be solved by a thermal network solver to determine, for example, thermal solutions including spatial and/or temporal temperature distribution, heat fluxes for transient analyses, etc. based on some prescribed initial and boundary conditions. At least a portion of this optional thermal solution may be further optionally provided to the subsequent fluid modeling as boundary conditions for the fluid flow field solver module to solve the fluid flow field in the surrounding medium for thermal parameters (e.g., convective heat transfer coefficient, specific enthalpy, specific heat capacity at constant pressure, specific heat capacity at constant pressure, etc.) that correspond to the plurality of meshes or elements for the electronic design.

In some embodiments where the thermal RC network is not solved prior to the fluid modeling, the consideration of conserving computational resources outweighs the need for more accurate boundary conditions. In these embodiments, any solution of the thermal RC network may involve some guesstimates for the initial or boundary conditions, and the convective heat transfer between the electronic design and its surrounding medium is still lacking prior to the analysis of the flow field in the surrounding medium is complete. In other words, although the thermal solution of the thermal RC network prior to the fluid flow analysis may perfectly serve as boundary conditions for the fluid flow analysis, the accuracy of the thermal solution may count against the runtime needed to obtain the thermal solution, and the thermal RC network of the electronic design thus may not be performed prior to the fluid flow analysis.

Similar to those embodiments where the thermal solution of the electronic design is not determined for the thermal RC network prior to the fluid modeling, these thermal parameters may also be determined by different techniques and may be further converted into equivalent thermal circuit elements (e.g., resistive elements, capacitive elements, etc.) for at least the elements or meshes along the solid-fluid interface between the electronic design and its surrounding medium. These equivalent thermal circuit elements may be integrated with the thermal RC network of the electronic design to generate the thermal network for both the electronic design and its surrounding medium.

Thermal analyses may or may not be performed in the determination of the thermal RC network for the electronic design. For example, some techniques extract thermal RC circuit elements by applying a fictitious input power (e.g., 1 W) into the electronic design, performing one or more thermal analyses with this fictitious input power, and extracting the thermal RC circuit elements. In some other embodiments, the thermal RC network for the entire electronic design may be composed by using thermal models representing different devices or circuit components in the electronic design from libraries or databases.

A plurality of inputs for the thermal modeling may be identified at 306A. The plurality of inputs may include, for example, geometric properties, physical properties, thermodynamic properties, material specifications, etc. for steady-state and/or transient analyses. For example, in addition to thermal conductivity that may be referenced in both steady-state and transient analyses, densities and specific heat capacity at constant pressure at constant pressure may be identified for transient analyses. One or more of the plurality of inputs may be temperature dependent that may be co-solved during iterative analyses for higher accuracy. The plurality of inputs may also include the governing physical laws or equations (e.g., Fourier's law) as well as appropriate boundary conditions and heat sources. Some examples of inputs may include the ambient temperature, film coefficients, heat transfer coefficients, heat flow rates, heat fluxes, etc. One or more of these inputs (e.g., heat sources and heat fluxes) may also be time dependent and may thus be iterated in transient analyses for higher accuracy.

As presented with reference to FIGS. 1-2 above, thermal analyses may or may not be performed on the thermal RC network determined at 304A. In some embodiments, the thermal RC network may be directly combined with the equivalent thermal circuit elements determined for the surrounding medium without performing any thermal analyses on the thermal RC network for the electronic design prior to the determination of the equivalent thermal circuit elements. In some other embodiments, one or more steady-state or transient thermal analyses may be optionally performed on the thermal RC network to determined thermal solutions including, for example, spatial and or temporal temperature distribution, heat fluxes, various temperature dependent parameters or properties, or any other suitable thermal solutions. In these embodiments, the optional thermal solutions may be provided to a fluid modeling module that may impose at least some of the optional thermal solutions at or near the interface between the electronic design and its surrounding medium as boundary conditions for the analysis of the surrounding medium. This optional performance of one or more thermal analyses on the thermal RC network of the electronic design is described below with reference to 308A through 314A.

At 308A, a thermal load may be optionally identified for the thermal RC network of the electronic design. The thermal load may be used as the heat source in the optional thermal analysis on the thermal RC network of the electronic design. The thermal load may be relatively realistic in some embodiments or completely fictitious in some other embodiments. For example, the nominal input powers or power curves (temporal power distribution) may be identified at 308A as the relatively realistic thermal loads in some embodiments. In some other embodiments, entirely fictitious thermal loads such a nominal 1-Watt input power may be identified at 308A as the thermal load.

A first thermal load value for the identified thermal load may be optionally identified at 310A. In some embodiments where a nominal input power is identified at 308A, the value of the nominal input power may be identified at 310A. In some other embodiments where a variable input power (e.g., a time-dependent input power) is identified at 308A, an input power value may be identified from the variable input power. For example, the maximum input power value in the range of the variable power may be identified at 310A. As another example, the minimum input power value in the range of the variable power may be identified at 310A.

One or more thermal analyses may be optionally performed with the identified thermal load value as the heat generation source at 312A to determine thermal solutions for the thermal RC network of the electronic design using one or more heat transfer mechanisms (e.g., conduction mechanism, convection mechanism, radiation mechanism, or any combinations thereof). The thermal solutions may include, for example, spatial and/or temporal temperature distribution, temperature gradients, heat fluxes, thermodynamic properties, or any other suitable values, properties, or characteristics, etc. Once the thermal solutions are determined for the first thermal load value, the process may optionally return to 310A to identify another thermal load value and determine the corresponding thermal solutions for the thermal RC network with this newly identified thermal load value as the heat source.

One or more sets of thermal solutions may thus be determined for one or more thermal load values 312A in some embodiments. In these embodiments, the variable thermal load may be approximated with a suitable approximation function (e.g., a linear or higher-order polynomial or any other suitable function). The thermal solutions for any thermal load values that have not been identified and used in determining thermal solutions at 312A may be determined from the thermal solutions determined at 312A based in part or in whole upon the approximation function for the thermal load. In some embodiments where some thermal analyses are performed to determine the thermal RC network for the electronic design, the thermal solutions determined at 312A may be provided to 304A to aid the determination of the thermal RC network of the electronic design. The optionally determined thermal solutions may be provided to a fluid modeling module that imposes the thermal solutions as boundary conditions on the meshes or elements of the electronic design at or near the interface between the electronic design and its surrounding elements at 314A.

Figure 3B:
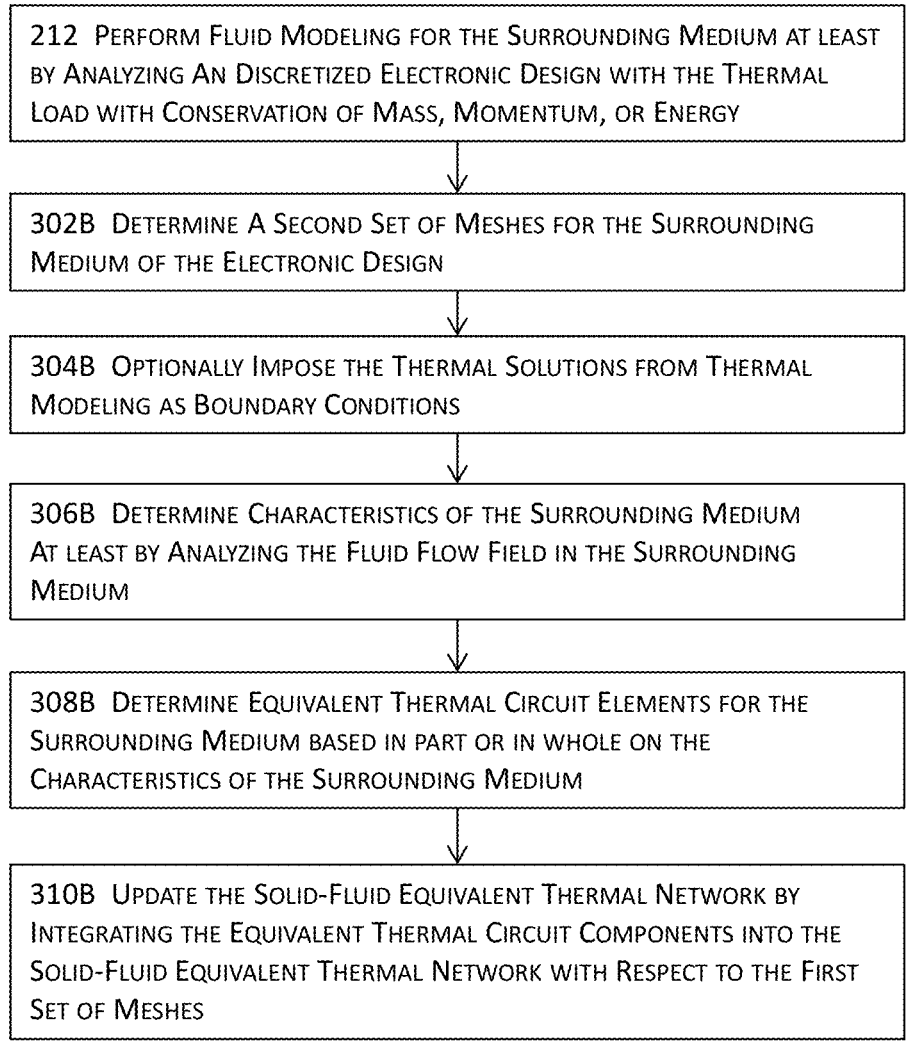
FIG. 3B illustrates a more detailed block diagram for another portion of the block diagram illustrated in FIG. 2 in some embodiments.

FIG. 3B illustrates a more detailed block diagram for another portion of the block diagram illustrated in FIG. 2 in some embodiments. More specifically, FIG. 3B illustrates more details about the performance of fluid modeling in some embodiments. In these embodiments, a second set of meshes or elements may be determined at 302B for the surrounding medium of the electronic design. In some embodiments where the optional thermal analyses are performed on the thermal RC network during the thermal modeling stage, the thermal solutions may be imposed as boundary conditions at 304B in fluid modeling at least for the first meshes or elements at or near the interface between the electronic design and its surrounding medium. Characteristics of the surrounding medium may be determined at least by analyzing the fluid flow field in the surrounding medium at 306B. In some embodiments, the characteristics include the thermal parameters of the surrounding medium, at least for the second meshes or elements at or near the interface of the electronic design and its surrounding medium. The characteristics may include, for example, convective heat transfer coefficient, specific enthalpy, specific heat capacity at constant pressure, specific heat capacity at constant pressure, or any other desired or required characteristics of the surrounding medium, etc.

Equivalent thermal circuit elements may be determined at 308B for the surrounding medium based in part or in whole upon the characteristics of the surrounding medium determined at 306B. As presented above, in some embodiments where the convective heat transfer coefficient (hi) is determined for the i-th interface mesh or element, the convective heat transfer from the surrounding medium may be converted into an equivalent thermal resistor $R_{EQ}$, where $R_{EQ}=1/(hi \times Ai)$, where Ai denotes the surface area of the i-th first mesh or element of the electronic design interacting with the surrounding medium.

As another example, in some embodiments where thermal conductivity (ki) is determined for the surrounding medium, an equivalent thermal resistor, $L/(k \times Ai)$ may be determined for the i-th first mesh or element having an effective area of Ai and a characteristic length L of the electronic design. For transient analyses, fluid thermal capacitances may also be determined from the specific heat capacity that may be in turn determined by post processing thermal analysis results or from empirical formulae. One example of such empirical formulae that may be used to compute the specific heat capacity h for air is $h=10.45-V+10 \times V^2$, where V denotes the relative speed of the flow field and may be obtained from the fluid modeling.

Once these equivalent thermal circuit elements of the surrounding medium have been determined at 308B with respect to the corresponding first meshes or elements of the electronic design, these equivalent thermal circuit elements may be integrated at 310B with the thermal RC network of the electronic design to create the solid-fluid thermal network that captures both the heat transfer phenomenon of the electronic design as well as the thermal or thermodynamic interactions between the electronic design and its surrounding medium.

Figure 4A:
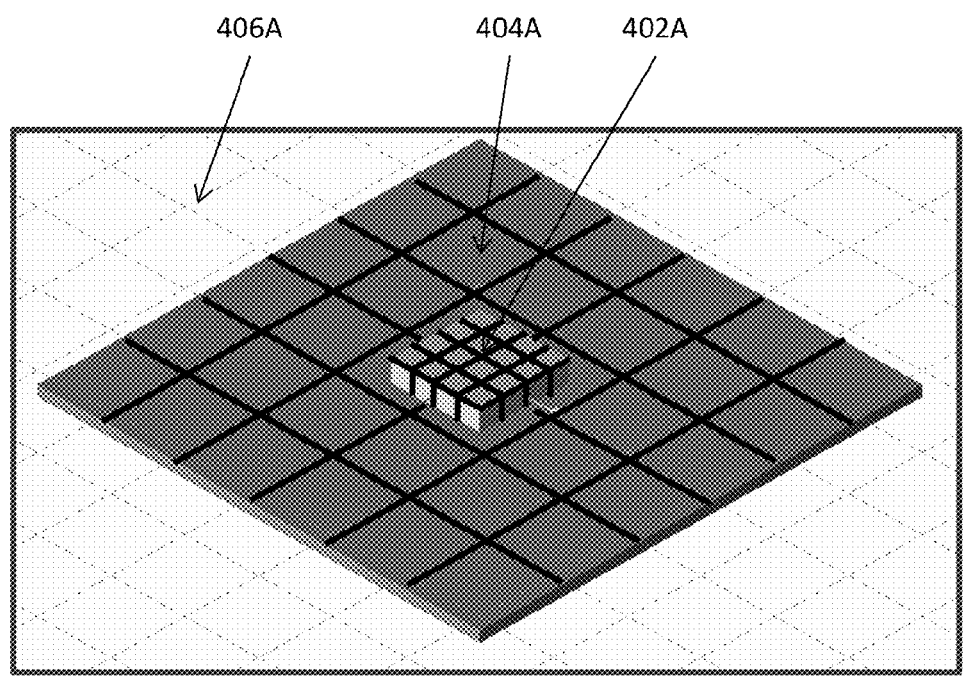
FIG. 4A illustrates an example of an electronic design and its surrounding medium in some embodiments.

FIG. 4A illustrates an example of an electronic design and its surrounding medium in some embodiments. More specifically, FIG. 4A illustrates an electronic design including an IC package 402A and a printed circuit board 404A in a surrounding medium 406A. FIG. 4A also illustrates that the IC package 402A and the PCB are discretized into two different sets of meshes or elements for which thermal parameters and hence equivalent thermal circuit elements may be determined from fluid modeling.

Figures 1, 4B:
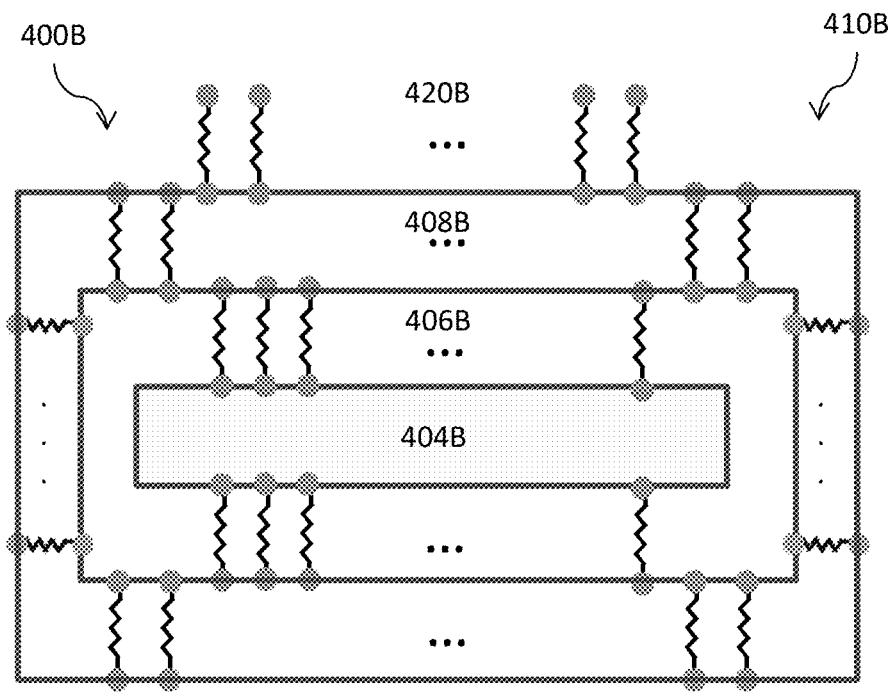
Figures 2, 4B:
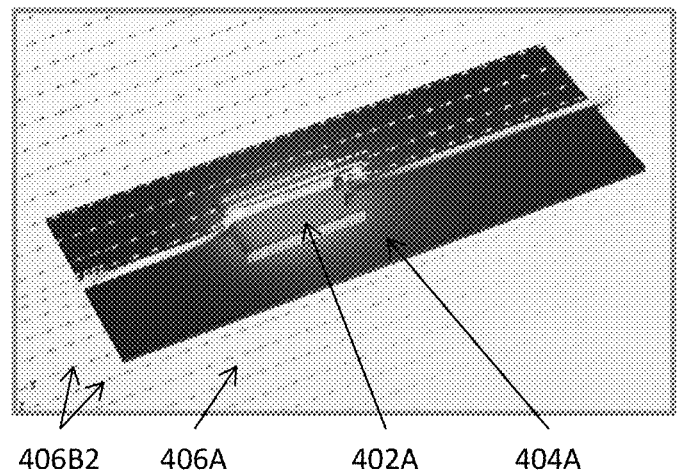

FIG. 4B-1 illustrates a simplified example of a thermal network generated with various techniques described herein for the electronic design and its surrounding medium illustrated in FIG. 4A in some embodiments. FIG. 4B-1 illustrates integrating equivalent thermal circuit elements 402B with a simplified representation of a thermal network 400B that is obtained by integrating the thermal RC network 404B for both the IC package 402A and the PCB 404A with the equivalent thermal circuit elements 402B. Each equivalent thermal circuit element 402B captures the thermal interaction between a mesh or element (or a node thereof) of the electronic design and the surrounding fluid.

In this simplified example, each equivalent thermal circuit element 402B represents a thermal resistor connecting the equivalent constant voltage (constant ambient temperature) and corresponding voltage (the temperature on the exterior surface of the corresponding mesh or element) of the thermal RC network of the electronic design. It shall be noted that the illustration of equivalent thermal circuit elements 402B on the top and bottom surfaces of the thermal RC network 404B is presented for the ease of illustration, and that other equivalent thermal circuit elements may also be integrated with the vertical boundaries (the left and/or right boundaries of 404B). These techniques described herein do not apply only to an IC package (e.g., 402A) and PCB (e.g., 404B) as described above. These techniques described herein apply with full and equal effects to one or more IC packages (e.g., 402A), a PCB (e.g., 404A) on which the one or more IC packages are mounted, a chassis or enclosure (e.g., a server box), and a server rack in which the server box is located, etc. As FIG. 4B-1 shows, these techniques may construct the equivalent thermal network by connecting the thermal RC network 404B for the IC package and the PCB, the thermal RC network 406B for the chassis or enclosure, the thermal RC network 408B for the server rack, as well as the equivalent thermal circuit elements 406B, 408B, and 410B representing the surrounding media.

More specifically, the equivalent thermal circuit elements 406B may be generated to represent the surrounding medium between the electronic design and its surrounding medium inside a chassis housing the electronic design; the equivalent thermal circuit elements 408B may be generated to represent the surrounding medium between the chassis and the server rack for the electronic design; and the equivalent thermal circuit elements 420B may be generated to represent the surrounding medium outside the server rack housing the electronic design. It shall be noted that although only the resistivity circuit elements are shown in FIG. 4B-1, various thermal RC networks and the integrated thermal network may also include various capacitive circuit elements that are usually connected in parallel for various thermal analyses (e.g., transient thermal analyses).

FIG. 4B-2 illustrates a three-dimensional contour plot of thermal and fluid flow field solutions obtained with the solid-fluid thermal network determined by integrating the thermal RC network 402B and the equivalent thermal circuit elements 404B. The vector field 406B2 in FIG. 4B-2 illustrates the velocity field in the surrounding medium 406A, and the contour plot in FIG. 4B-2 illustrates the temperature distribution determined by performing thermal analyses on the thermal network 400B with an input power to the electronic design as a heat source.

Figure 5A:
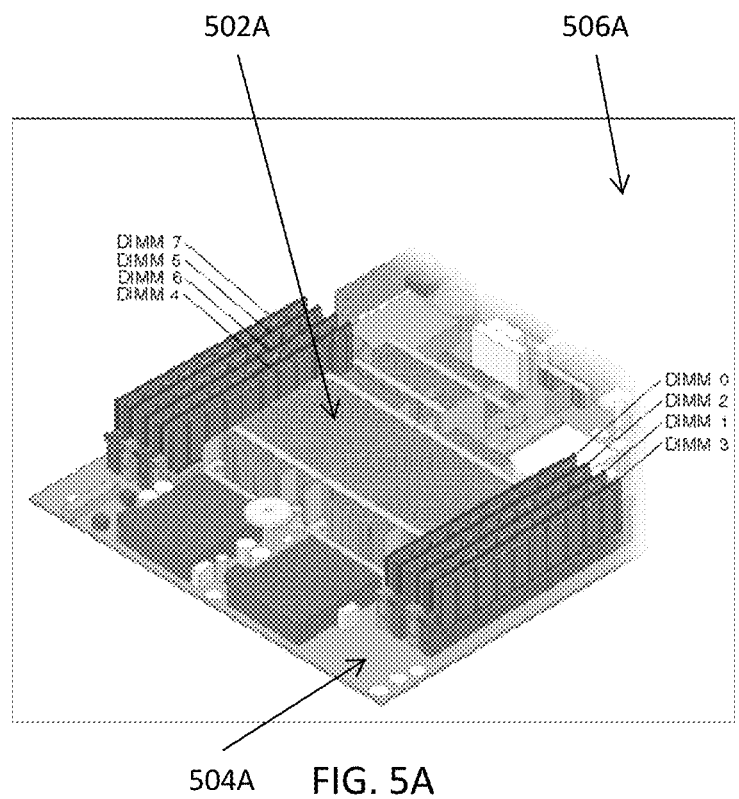
FIG. 5A illustrates another example of an electronic design and its surrounding medium in some embodiments.
Figure 5B:
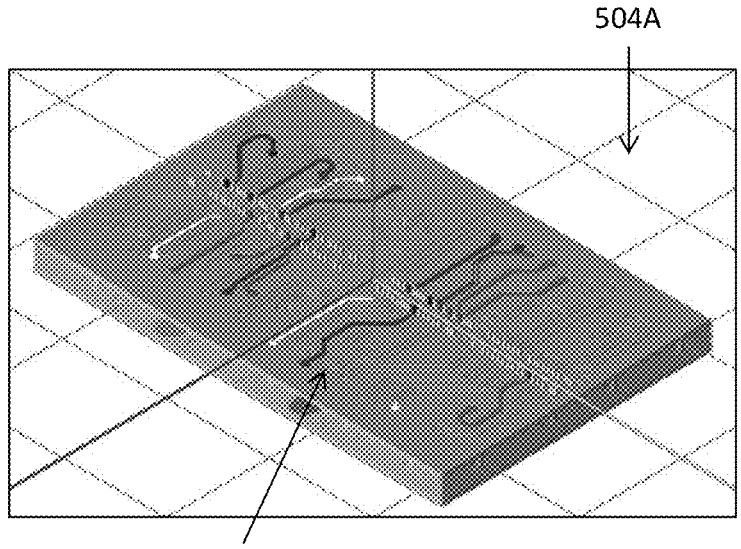
FIG. 5B illustrates a zoom-in view of a portion of the electronic design illustrated in FIG. 5A in some embodiments.

FIG. 5A illustrates another example of an electronic design and its surrounding medium in some embodiments. More specifically, FIG. 5A illustrates an electronic design including an IC package attached to a heat sink 502A and a printed circuit board 504A in a surrounding medium 506A. It shall be noted that one or more other layers in an IC package (e.g., a solder bump layer, a flip chip layer, a solder ball layer, etc.) may also be exactly or approximately modeled in two-, three-dimensional models or pseudo-three-dimensional models. Nonetheless, these one or more other layers are suppressed in FIGS. 5A-D for a cleaner demonstration of the topological characteristics and the thermal behaviors of the integrated circuits, the PCB, and the surrounding medium. FIG. 5B illustrates a zoom-in view of a portion of the electronic design illustrated in FIG. 5A in some embodiments. More specifically, FIG. 5B illustrates a close-up view 502B of solid model of the IC package 502A with the molding compound where the heat sink 502A are suppressed or hidden to reveal more detailed solid models for various circuit components in the IC package.

Figure 5C:
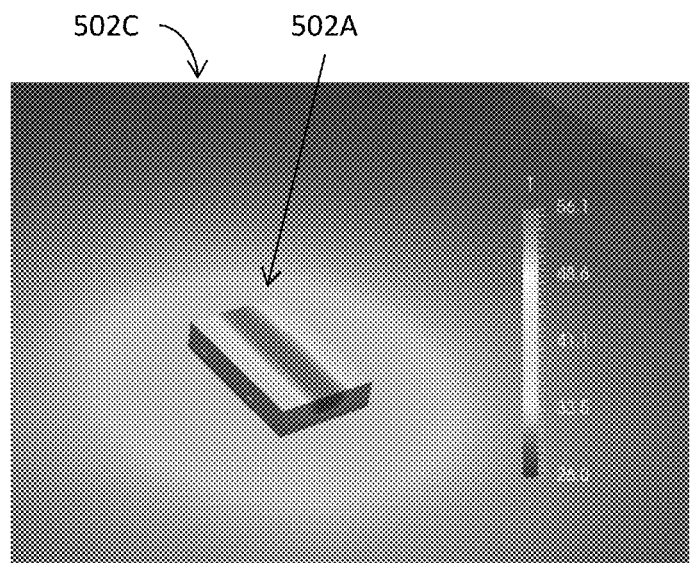
FIG. 5C illustrates a sample of overall temperature distribution determined with various techniques described herein for the electronic design and its surrounding medium in some embodiments.

FIG. 5C illustrates a sample of overall temperature distribution determined with various techniques described herein for the electronic design and its surrounding medium in some embodiments. More specifically, FIG. 5C illustrates a three-dimensional contour plot 502C of thermal solutions for the electronic design and its surrounding medium that are determined by performing one or more thermal analyses on the solid-fluid thermal network determined by integrating the thermal RC network of the electronic design (for the IC package attached to the heatsink 502A and the printed circuit board 504A) and equivalent thermal circuit elements for the surrounding medium 506A.

Figure 5D:
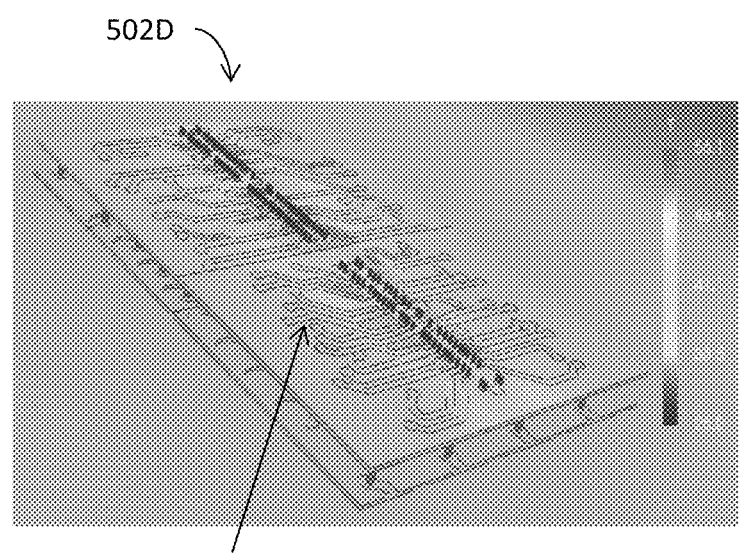
FIG. 5D illustrates a zoom-in view of the sample of overall temperature distribution for the electronic design and its surrounding medium in some embodiments.

FIG. 5D illustrates a close-up view of the sample of overall temperature distribution for the electronic design and its surrounding medium in some embodiments. More specifically, FIG. 5D illustrates a close-up, three-dimensional contour plot 502D of thermal solutions for the portion of the IC package with the molding compound and the dielectrics removed (504D) in the electronic design and the surrounding medium in the region represented by the close-up view 502B.

Figure 6A:
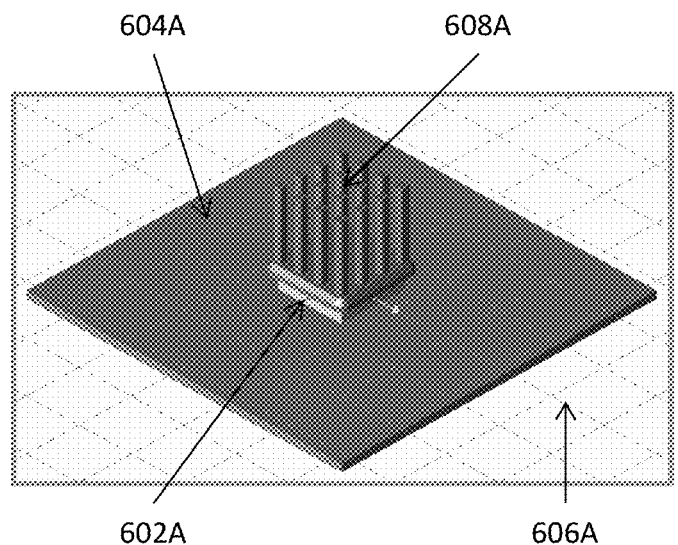
FIG. 6A illustrates another example of an electronic design including a heatsink and its surrounding medium in some embodiments.

FIG. 6A illustrates another example of an electronic design including a heatsink and its surrounding medium in some embodiments. More specifically, FIG. 6A illustrates a three-dimensional model of an electronic design including a heatsink 608A attached to an IC package 602A and a printed circuit board 604A in a surrounding medium 606A.

Figure 6B:
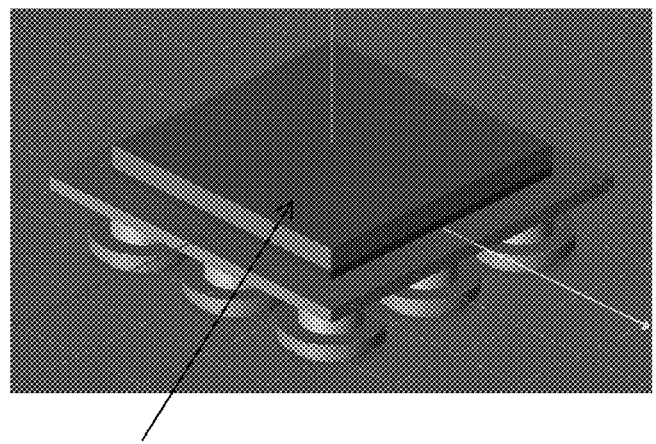
FIG. 6B illustrates a zoom-in view of a portion of the electronic design and its surrounding medium illustrated in FIG. 6A in some embodiments.

FIG. 6B illustrates a zoom-in view of a portion of the electronic design and its surrounding medium illustrated in FIG. 6A in some embodiments. FIG. 6B illustrates a close-up view of the three-dimensional solid model for the IC package 602A where the molding compound and the heatsink 608A are suppressed to review more details of the IC package 602A.

Figure 6C:
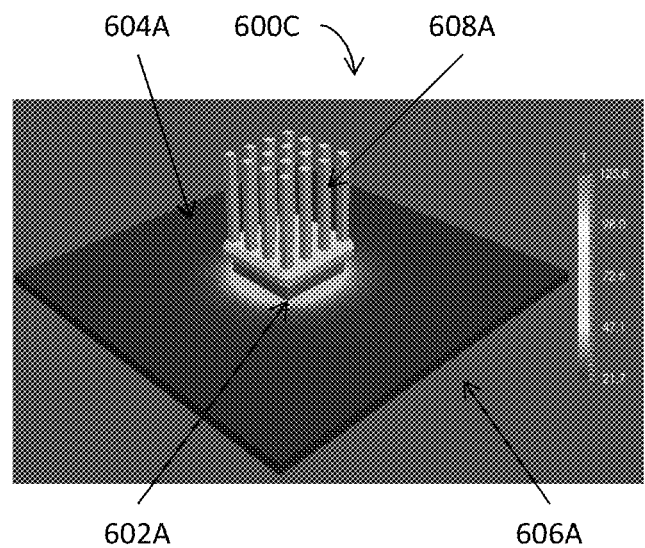
FIG. 6C illustrates a sample of overall temperature distribution determined with various techniques described herein for the electronic design and its surrounding medium illustrated in FIG. 6A in some embodiments.

FIG. 6C illustrates a sample of overall temperature distribution determined with various techniques described herein for the electronic design and its surrounding medium illustrated in FIG. 6A in some embodiments. More specifically, FIG. 6C illustrates a three-dimensional contour plot 600C of thermal solutions for the electronic design and its surrounding medium that are determined by performing one or more thermal analyses on the solid-fluid thermal network determined by integrating the thermal RC network of the electronic design (602A, 604A, and 608A) and equivalent thermal circuit elements for the surrounding medium 606A.

Figure 6D:
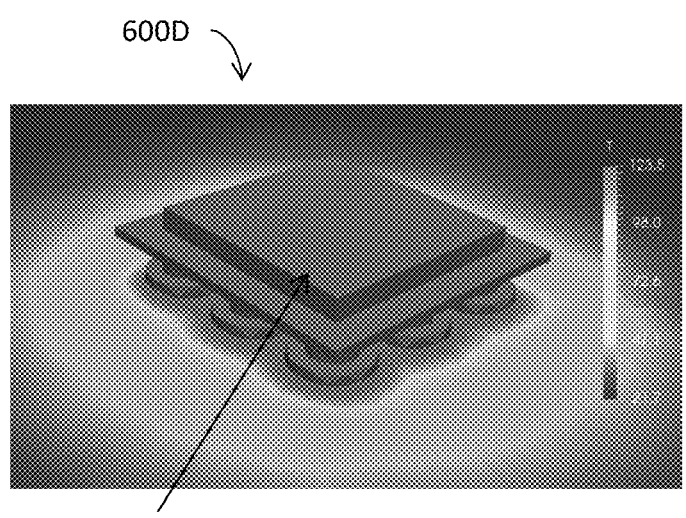
FIG. 6D illustrates a zoom-in view of the overall temperature distribution determined with various techniques described herein for portion of the electronic design and its surrounding medium illustrated in FIG. 6B in some embodiments.

FIG. 6D illustrates a zoom-in view of the overall temperature distribution determined with various techniques described herein for portion of the electronic design and its surrounding medium illustrated in FIG. 6B in some embodiments. More specifically, FIG. 6D illustrates a close-up, three-dimensional contour plot 600D of thermal solutions for the portion of the electronic design and surrounding medium in the region represented by the close-up view 602B.

Figure 7A:
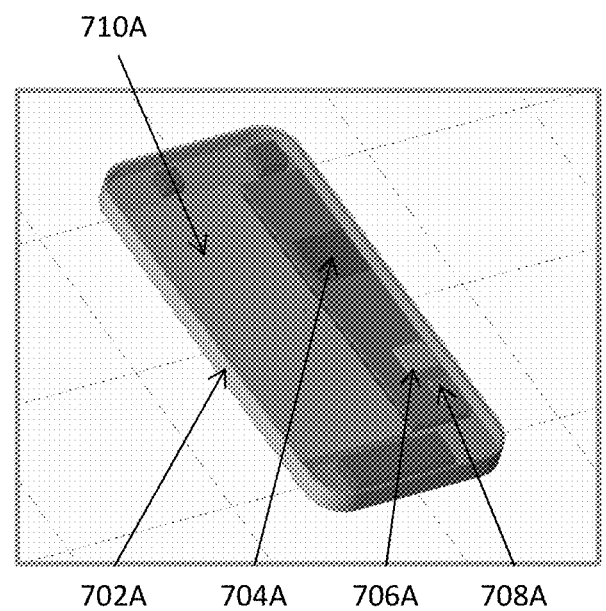
FIG. 7A illustrates an example of an electronic design in an enclosure and its surrounding medium in some embodiments.

FIG. 7A illustrates an example of an electronic design in an enclosure and its surrounding medium in some embodiments. More specifically, FIG. 7A illustrates a simplified three-dimensional solid model of an electronic design including three IC packages 704A, 706A, and 708A mounted on a PCB 710A that is further enclosed in an enclosure 702A whose top portion is suppressed to reveal the details within the enclosure 702A.

Figure 7B:
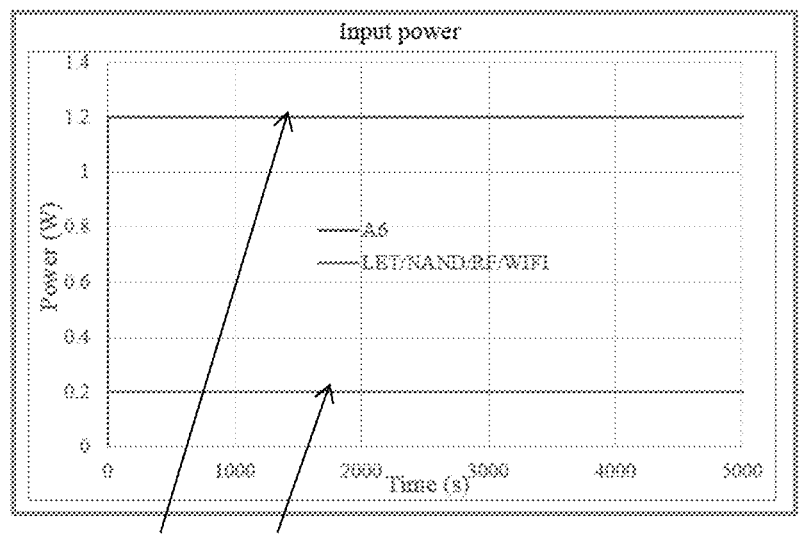
FIG. 7B illustrates an example of power inputs for the electronic design illustrated in FIG. 6A in some embodiments.
Figure 1:
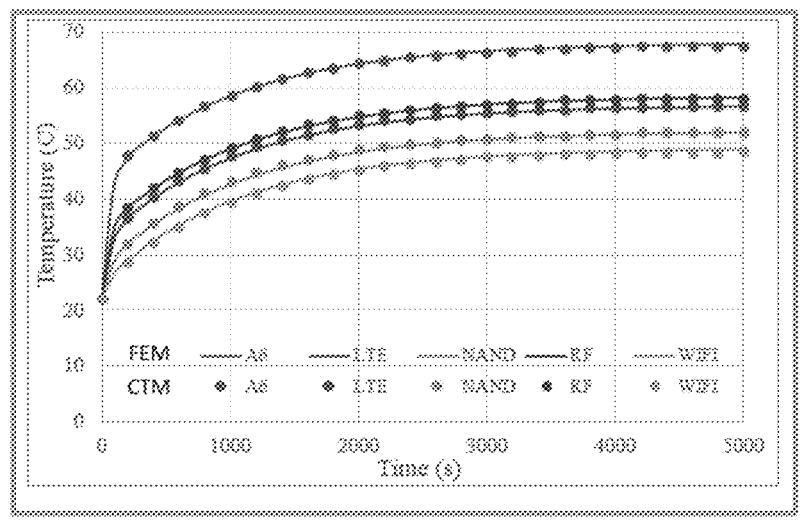

FIG. 7B illustrates an example of power inputs for the electronic design illustrated in FIG. 7A in some embodiments. More specifically, FIG. 7B illustrates the first input power curve 702B for IC package 704A and the second input power curve 704B for IC packages 706A and 708A. FIG. 7B-1 illustrates an example of transient thermal analysis results in response to the input powers illustrated in FIG. 7B for various components in the electronic design illustrated in FIG. 7A in some embodiments. More specifically, FIG. 7B illustrates two sets of transient analysis results of the temporal temperature distribution of individual circuit devices in the electronic design over the time period of 0 to 5,000 seconds.

The first set of transient analysis results represented by the solid lines is obtained by performing conjugate thermal analyses on three-dimensional models of the electronic design and its surrounding medium illustrated in FIG. 7A and thus provide state-of-the-art accuracy despite the long runtime to obtain the final solution. The second set of transient analysis results represented as the scattered plots is determined by performing a transient thermal analysis on a solid-fluid thermal network that is determined with techniques described herein to capture the thermal behaviors of both the electronic design and its surrounding medium without performing conjugate thermal analyses. The numerical results in FIG. 7B-1 have demonstrated that the second set of transient analysis results with the solid-fluid thermal network provides nearly identical accuracy as the three-dimensional conjugate thermal analyses.

Figure 7C:
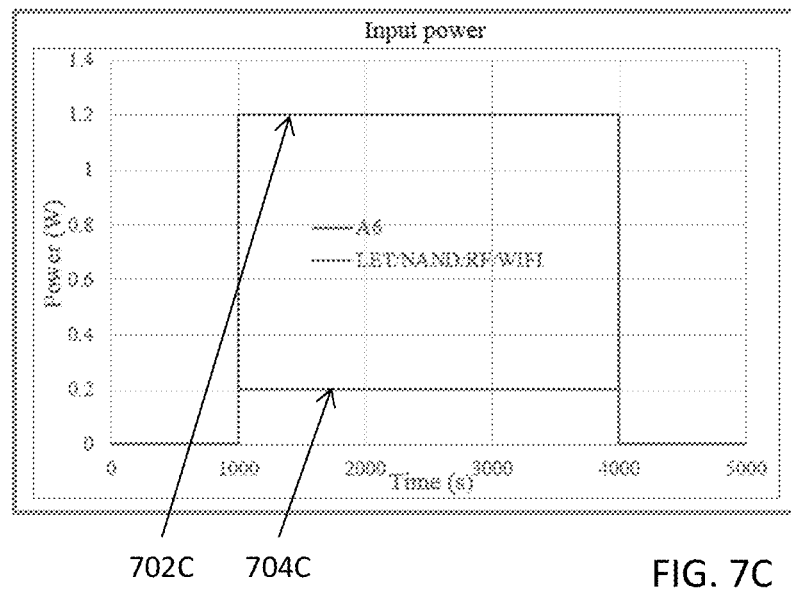
FIG. 7C illustrates another example of power inputs for the electronic design illustrated in FIG. 6A in some embodiments.
Figure 1:
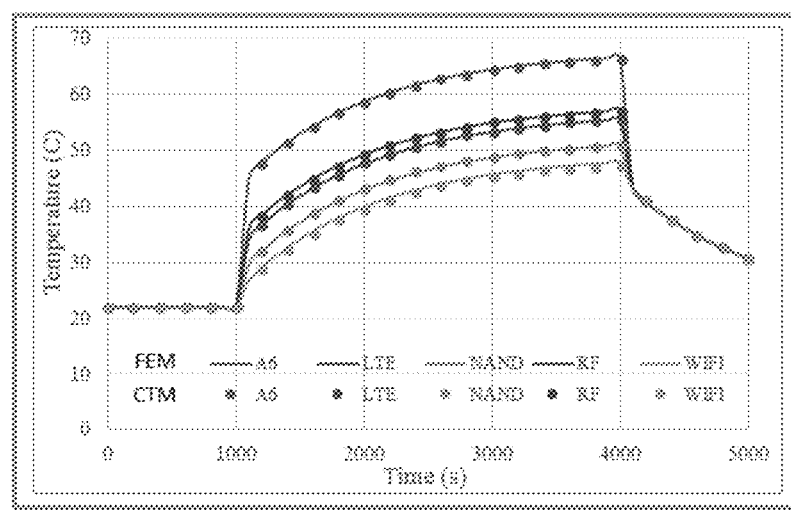

FIG. 7C illustrates another example of power inputs for the electronic design illustrated in FIG. 7A in some embodiments. More specifically, FIG. 7C illustrates the first input power curve or profile 702C for IC package 704A and the second input power curve or profile 704C for IC packages 706A and 708A. FIG. 7C-1 illustrates an example of transient thermal analysis results in response to the input powers 702C and 704C illustrated in FIG. 7C for various components in the electronic design illustrated in FIG. 7A in some embodiments.

More specifically, FIG. 7C-1 illustrates two sets of transient analysis results of the temporal temperature distribution of individual circuit devices in the electronic design over the time period of 0 to 5,000 seconds, while the input power curves or profiles 702C and 704C indicate that IC packages 704A, 706A, and 709A are powered on between 1,000-th and 4,000-th second and are off during the other time periods. As the benchmark results illustrated in FIG. 7B-1, the first set of transient analysis results represented by the solid lines is obtained by performing conjugate thermal analyses on three-dimensional models of the electronic design and its surrounding medium illustrated in FIG. 7A and thus provide state-of-the-art accuracy despite the long runtime to obtain the final solution.

The second set of transient analysis results represented as the scattered plots is determined by performing a transient thermal analysis with the input power curves 702C and 704C on the same solid-fluid thermal network that is determined with techniques described herein to capture the thermal behaviors of both the electronic design and its surrounding medium without performing conjugate thermal analyses. The numerical results in FIG. 7C-1 similarly demonstrate that the second set of transient analysis results with the solid-fluid thermal network provides nearly identical accuracy as the three-dimensional conjugate thermal analyses. It shall be noted that although each device in FIG. 7B-1 and FIG. 7C-1 appears to correspond to a single temperature for a given time point, each device may nevertheless be discretized into a plurality of meshes or elements and may thus produce a plurality of temperature readings for each of the plurality of meshes or elements.

Figure 7D:
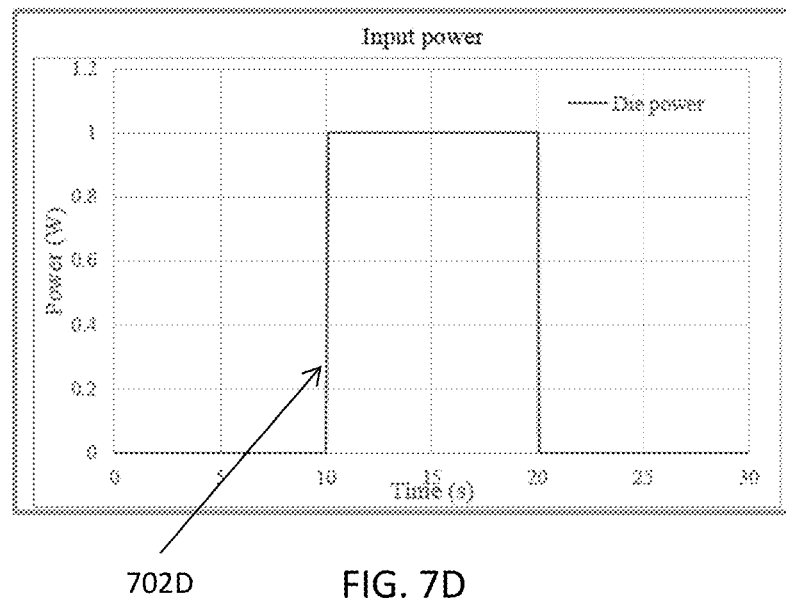
FIG. 7D illustrates an example of a pulse power input for the electronic design illustrated in FIG. 6A in some embodiments.
Figure 1:
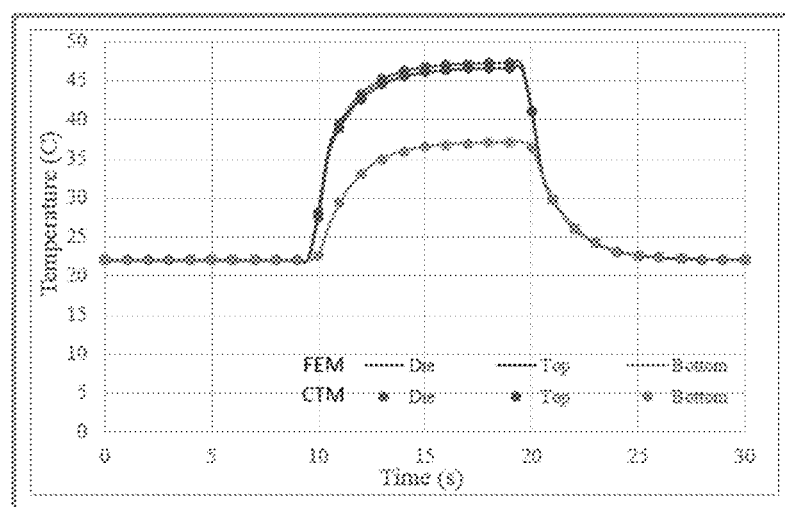

FIG. 7D illustrates an example of a pulse power input for the electronic design illustrated in FIG. 6A in some embodiments. More specifically, FIG. 7D illustrates a pulse power input curve or profile 702D that powers on a device during the time period between 10-th and 20-th second. FIG. 7D-1 illustrates two sets of transient thermal analysis results using the power curve or profile 702D as the time-dependent heat source. The first set of transient analysis results represented by the solid lines is obtained by performing conjugate thermal analyses on three-dimensional models of the electronic design and its surrounding medium and thus provides state-of-the-art accuracy.

The second set of transient analysis results represented as the scattered plots is determined by performing a transient thermal analysis with the input power curve or profile 702D on a solid-fluid thermal network that is determined with techniques described herein to capture the thermal behaviors of both the electronic design and its surrounding medium without performing conjugate thermal analyses. The numerical results in FIG. 7D-1 similarly demonstrate that the second set of transient analysis results with the solid-fluid thermal network provides nearly identical accuracy as the three-dimensional conjugate thermal analyses.

Figure 7E:
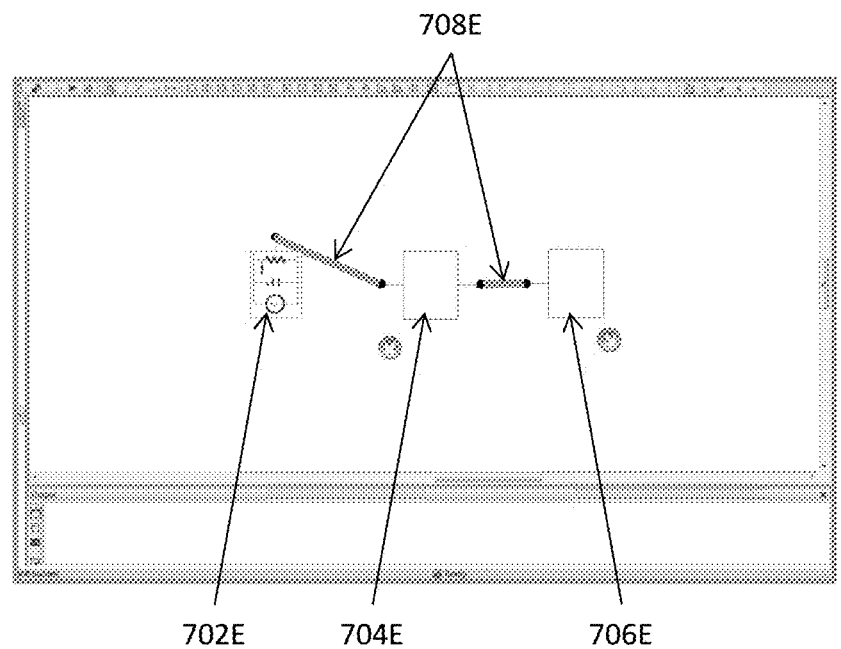
FIG. 7E illustrates an example of a user interface showing the composition of a thermal network using a set of thermal models from a central repository in some embodiments.
Figures 1, 7E:
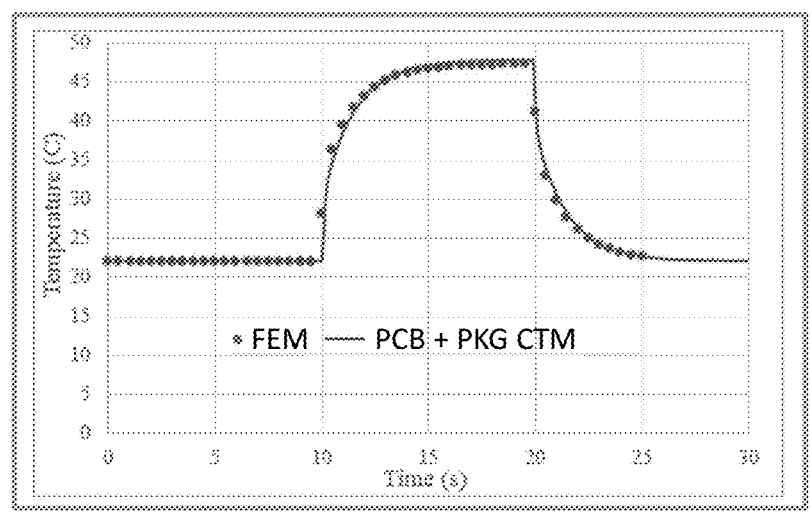

FIG. 7E illustrates an example of a user interface showing the composition of a thermal network using a set of thermal models from a central repository in some embodiments. More specifically, FIG. 7E illustrates the thermal RC network of the electronic design illustrated in FIG. 7A may be constructed by retrieving thermal RC circuit elements 702E, 704E, and 706E from a library and by inserting these thermal RC circuit elements into a canvas representing the thermal RC network in the user interface. The connections 708E representing thermal interactions between these individual thermal RC circuit elements 702E, 704E, and 706E may be automatically inserted by a thermal circuit module (e.g., 806) in some embodiments or manually by a designer in some other embodiments.

FIG. 7E-1 illustrates an example of thermal analysis accuracy comparison between techniques described herein and benchmark numerical techniques in some embodiments. More specifically, the analysis results illustrated in FIG. 7E-1 demonstrate that the transient thermal analysis results represented by scattered the plot and determined by using the thermal network described herein provide nearly identical accuracy as conventional conjugate thermal analysis results represented by the solid line plot and determined by iteratively solving the heat transfer phenomenon in the solid model (the electronic design) and its surrounding medium. Moreover, the runtime to determine the analysis results by using the thermal network is near seven (7) seconds, while the runtime to determine the analysis results by the conjugate thermal analysis is over 122 seconds for the same electronic design interacting with the same surrounding medium. Therefore, these techniques described herein provide identical or substantially similar performance while greatly conserving computational resources.

Figure 7G:
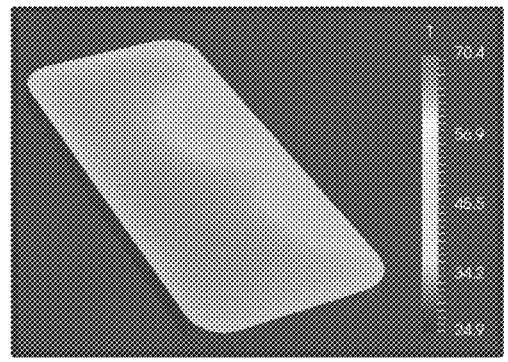
FIGS. 7G-7I illustrates some examples of contour plots of temperature distribution over the enclosure of the electronic design illustrated in FIG. 7A in some embodiments.
Figure 7H:
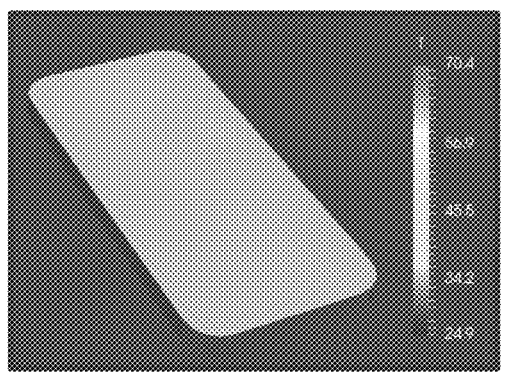
Figure 7I:
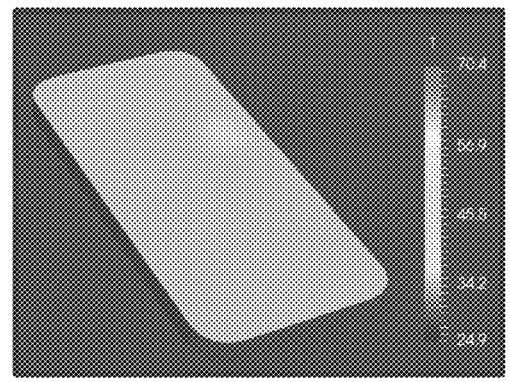

FIGS. 7G-7I illustrate some examples of contour plots of temperature distribution over the enclosure of the electronic design illustrated in FIG. 7A in some embodiments. More specifically, FIG. 7G illustrates an example of the temperature contour plot on the exterior of the enclosure (702A) at time instant T1; FIG. 7H illustrates another example of the temperature contour plot on the exterior of the enclosure (702A) at time instant T2; and FIG. 7I illustrates the other example of the temperature contour plot on the exterior of the enclosure (702A) at time instant T3, where T1<T2<T3.

Figure 7J:
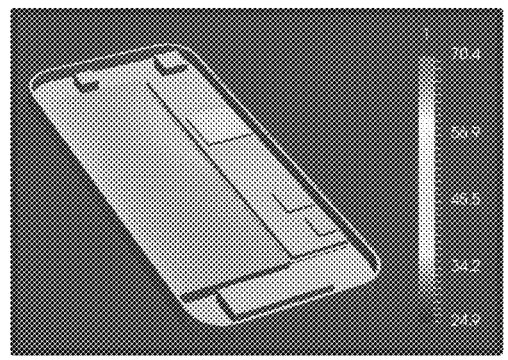
FIGS. 7J-7L illustrates some examples of contour plots of temperature distribution over the electronic design illustrated in FIG. 7A in some embodiments.
Figure 7K:
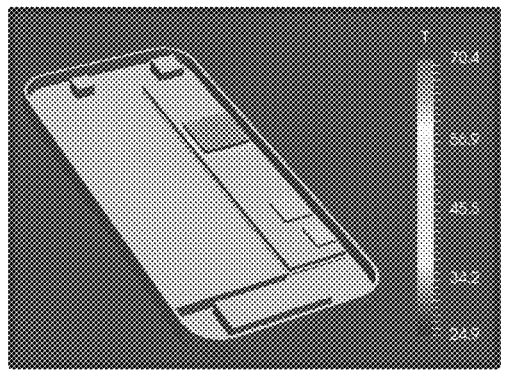
Figure 7L:
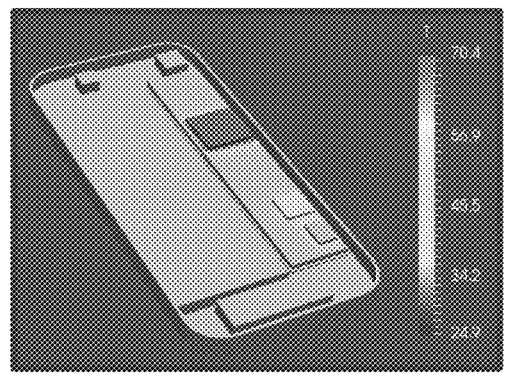

FIGS. 7J-7L illustrates some examples of contour plots of temperature distribution over the electronic design illustrated in FIG. 7A in some embodiments. More specifically, FIG. 7J illustrates an example of the temperature contour plot on the interior of the enclosure (702A) and IC packages (704A, 706A, and 708A) at time instant T1; FIG. 7K illustrates another example of the temperature contour plot on the interior of the enclosure (702A) and IC packages (704A, 706A, and 708A) at time instant T2; and FIG. 7L illustrates the other example of the temperature contour plot on the interior of the enclosure (702A) and IC packages (704A, 706A, and 708A) at time instant T3, where T1<T2<T3.

Figure 8:
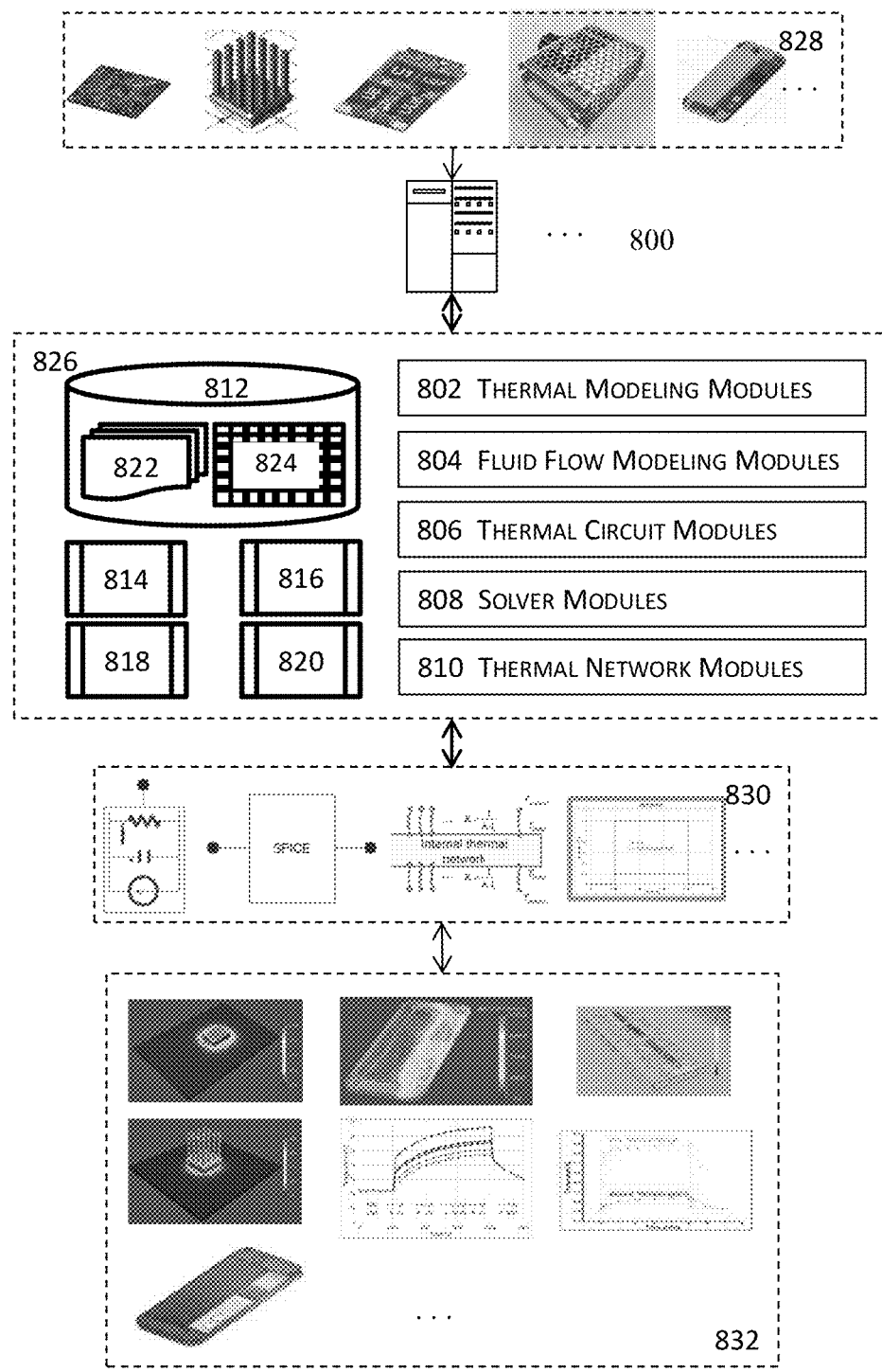
FIG. 8 illustrates an example of a system for implementing electronic designs with thermal analyses of the electronic design and the surrounding medium in some embodiments.

FIG. 8 illustrates an example of a system for implementing electronic designs with thermal analyses of the electronic design and the surrounding medium in some embodiments. More specifically, FIG. 8 illustrates an illustrative high level schematic block diagrams for implementing electronic designs with thermal analyses of the electronic design and the surrounding medium and may comprise one or more computing systems 100, such as a general purpose computer described in the System Architecture Overview section to implement one or more special proposes.

In some embodiments, the one or more computing systems 100 may identify or create an electronic design 828 and invoke various system resources such as the processor(s) or processor core(s), memory, disks, etc. to implement the electronic design 828 by guiding the implementation process with thermal analyses. The one or more computing systems 100 further invoke one or more resources 826 and perform one or more actions to generate various intermediate outputs 832 and final outputs 832. These intermediate outputs 830 may include, for example, individual thermal circuit elements for an electronic design, a thermal RC network for the electronic design, a thermal network capturing the thermal behaviors of the electronic design and its surrounding medium, etc. These final outputs 832 may include various steady-state or transient thermal analysis results for the thermal RC network for the electronic design, various steady-state or transient thermal analysis results for the thermal network capturing the thermal behaviors of both the electronic design and its surrounding medium, etc.

The one or more computing systems 100 may also initiate or interact with other computing systems to access, via a computer bus architecture (e.g., a system bus, a control bus, a data bus, or any combinations thereof), various resources 826 that may comprise a prototyping module 814, a floor-planning module 816, a global routing module and/or a detail routing module 818, a layout editor 820, a design rule checker (not shown), a verification module (not shown), etc.

The one or more computing systems 100 may further write to and read from a local or remote non-transitory computer accessible storage 812 that stores thereupon data or information such as, but not limited to, one or more databases such as individual thermal circuit element database(s), thermal or thermodynamic characteristic database(s), schematic design database(s), physical design database(s), and/or electronic circuit design specification database(s) (824). The local or remote non-transitory computer accessible storage 812 may also store various SAT (satisfiability)

logic and state models, various conjunctive normal forms, various statistics, various data, rule decks, various design rules, constraints, thermodynamic, physical, and electrical properties, various empirical formulae, or any other desired or required information or data (822) that may be used to facilitate the performance of various functions to achieve the intended purposes.

In some embodiments, the one or more computing systems 100 may include or, either directly or indirectly through the various computational resources (e.g., computer buses, memory, cache, etc.), invoke a set of mechanisms including hardware modules and software modules or combinations of one or more hardware modules and one or more software modules that may comprise one or more thermal modeling modules 802 to performing thermal modeling for electronic design of interest. The set of mechanisms may also include one or more fluid flow modeling modules 804 that analyze the fluid flow field to determine various characteristics (e.g., the thermal parameters of a surrounding medium).

The set of mechanisms may further optionally include one or more thermal circuit modules 806 that identify individual thermal circuit elements for electronic design components from a collection of existing thermal circuit elements or generate individual thermal circuit elements for electronic design components that correspond to no existing thermal circuit elements. These one or more thermal circuit modules 806 may also aid the construction of a thermal RC network for an electronic design by not only providing or constructing individual thermal circuit elements but also facilitating the interconnections between individual thermal circuit elements in a thermal RC network.

These one or more thermal circuit modules facilitate these interconnections by determining which thermal circuit elements may interact with each other based on the topological information of an electronic design from, for example, a prototyping layout, a physical layout of the electronic design, or the mere footprint specification in the design specification. These interconnections are unlike interconnections in the underlying electronic design where circuit elements are interconnected by the connectivity information. For example, two circuit devices in an electronic design may be completely disconnected from each but may nevertheless be interconnected in the corresponding thermal RC network because of their close proximity in the electronic design.

In addition or in the alternative, the set of mechanisms may include one or more solver modules 808 that solve for any desired or required solutions for any input models (e.g., a thermal RC network of an electronic design, a thermal network of an electronic design and its surrounding medium, a two- or three-dimensional heat transfer model under the Fourier law for an electronic design, a two- or three-dimensional discretized surrounding medium for computational fluid dynamics analyses, etc.). The set of modules may also include one or more thermal network modules 110 that solve a solid-fluid thermal network to capture the thermodynamic behaviors within an electronic design and the thermodynamic interactions between the electronic design and its surrounding medium.

In some embodiments, the computing system 100 may include the various resources such that these various resources may be invoked from within the computing system via a computer bus (e.g., a data bus interfacing a microprocessor and the non-transitory computer accessible storage medium or a system bus between a microprocessor and one or more engines in the various resources). In some other embodiments, some or all of these various resources may be located remotely from the computing system 100 such that the computing system may access the some or all of these resources via a computer bus and one or more network components.

The computing system may also include one or more mechanisms in the set of modules. One or more modules in the set may include or at least function in tandem with a microprocessor via a computer bus in some embodiments. In these embodiments, a single microprocessor may be included in and thus shared among more than one mechanism even when the computing system 100 includes only one microprocessor. A microprocessor may further access some non-transitory memory (e.g., random access memory or RAM) via a system bus to read and/or write data during the microprocessor's execution of processes.

System Architecture Overview

Figure 9:
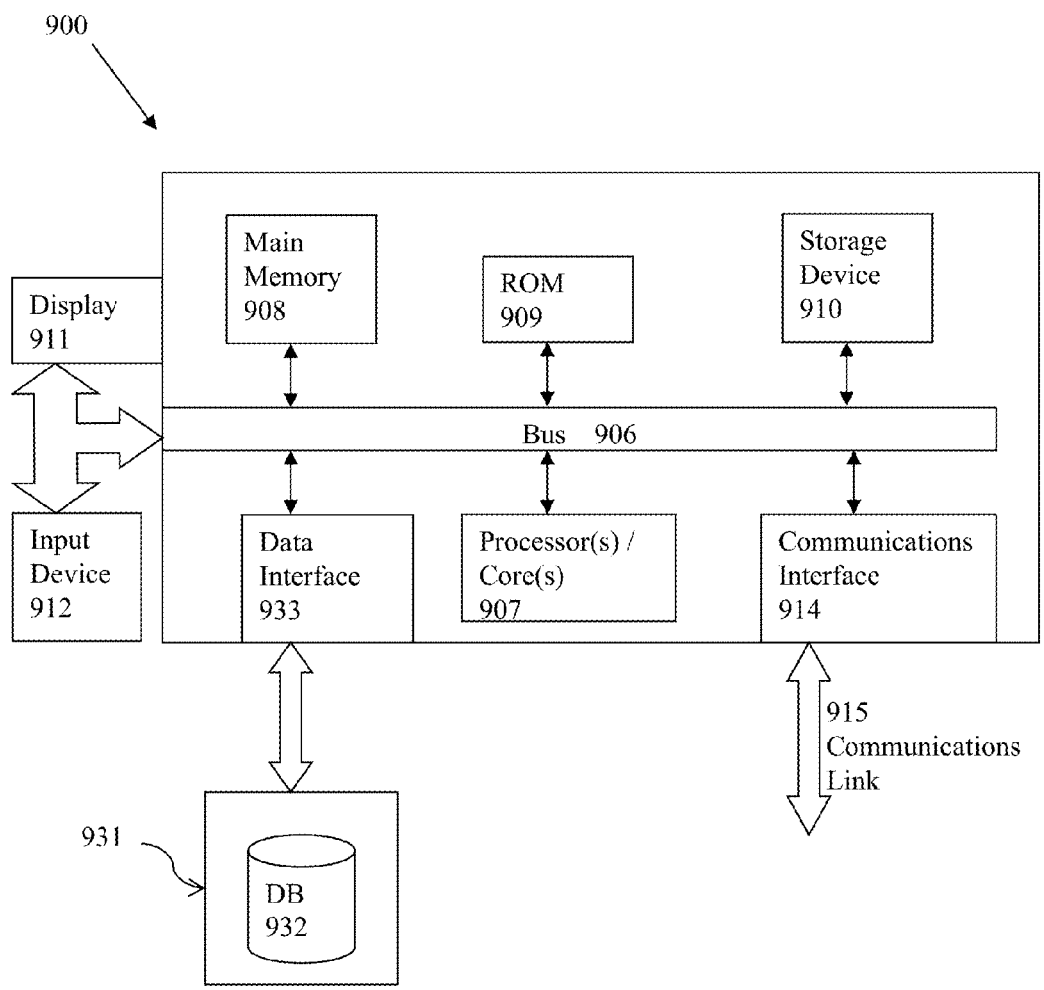
FIG. 9 illustrates a computerized system on which a method for implementing electronic designs with thermal analyses of the electronic design and the surrounding medium may be implemented.

FIG. 9 illustrates a block diagram of an illustrative computing system 900 suitable for implementing electronic designs with thermal analyses of the electronic design and the surrounding medium as described in the preceding paragraphs with reference to various figures. Computer system 900 includes a bus 906 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or Ethernet card), display 911 (e.g., CRT or LCD), input device 912 (e.g., keyboard), and cursor control (not shown).

According to one embodiment, computer system 900 performs specific operations by one or more processor or processor cores 907 executing one or more sequences of one or more instructions contained in system memory 908. Such instructions may be read into system memory 908 from another computer readable/usable storage medium, such as static storage device 909 or disk drive 910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 907, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution. In an embodiment, the computer system 900 operates in conjunction with a data storage system 931, e.g., a data storage system 931 that includes a database 932 readily accessible by the computer system 900. The computer system 900 communicates with the data storage system 931 through a data interface 933. A data interface 933, which is coupled to the bus 906, transmits and receives electrical, electromagnetic or optical signals that include data streams representing various types of signal information, e.g., instructions, messages and data. In embodiments of the invention, the functions of the data interface 933 may be performed by the communication interface 914.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing electronic designs with thermal analyses of the electronic design and its surrounding medium, comprising:
performing a process by executing a sequence of instruction by at least one processor or at least one processor core that executes one or more threads of execution, the process comprising:
performing thermal modeling that determines at least a thermal RC network that represents an electronic design;
reducing complexity or state space size of one or more thermal analyses at least by generating, at a thermal network module stored at least partially in memory of and functioning in conjunction with the at least one processor or the at least one processor core, a thermal network at least by integrating the thermal RC network for the electronic design with a plurality of equivalent thermal circuit elements representing one or more thermal characteristics or parameters of one or more surrounding media in at least a region surrounding the electronic design; and
generating or modifying the electronic design with an implementation process at least by guiding the implementation process based in part or in whole upon results of performing the one or more thermal analyses on the thermal network.

2. The computer implemented method of claim 1, the process further comprising:
generating equivalent thermal circuit elements for the one or more surrounding media at least by performing fluid modeling for the one or more surrounding media.

3. The computer implemented method of claim 2, the process further comprising:
determining thermal behaviors of the electronic design and thermal interactions between the electronic design and the one or more surrounding media at least by performing the one or more thermal analysis on the thermal network.

4. The computer implemented method of claim 1, performing the thermal modeling comprising:
identifying the thermal RC network of the electronic design into the thermal network;
determining a set of first meshes or elements including a plurality of first nodes for the electronic design at least by discretizing the electronic design with a discretizing scheme; and
identifying a plurality of inputs for the thermal modeling.

5. The computer implemented method of claim 4, the plurality of inputs comprising at least one of one or more geometric properties, one or more physical properties, one or more thermodynamic properties, one or more boundary conditions, and one or more heat generation sources.

6. The computer implemented method of claim 4, performing the thermal modeling further comprising:
identifying a thermal load comprising one or more thermal load values into the electronic design;
identifying a first thermal load value from the thermal load; and
determining thermal solutions for the electronic design with the first thermal load value at least by analyzing one or more heat transfer mechanisms with the thermal RC network for the electronic design.

7. The computer implemented method of claim 4, generating the thermal network comprising:
determining a set of second meshes or elements including a plurality of second nodes for the one or more surrounding media;
identifying a set of boundary conditions for an interface between the electronic design and the one or more surrounding media; and
determining one or more characteristics of a set of the one or more surrounding media at least by analyzing the fluid flow field in the one or more surrounding medium.

8. The computer implemented method of claim 7, generating the thermal network further comprising:
identifying a plurality of first meshes or elements corresponding to the interface from the set of first meshes or elements; and
identifying a plurality of second meshes or elements corresponding to the interface from the set of second meshes or elements.

9. The computer implemented method of claim 8, generating the thermal network further comprising:
determining equivalent thermal circuit elements for the plurality of second meshes or elements of the one or more surrounding media based in part or in whole upon the one or more characteristics of the one or more surrounding media; and updating the thermal network at least by integrating the equivalent thermal circuit elements with the thermal RC network of the electronic design.

10. The computer implemented method of claim 9, generating or modifying the electronic design comprising:

identifying at least one input power profile comprising a plurality of input power values for the electronic design;

prescribing a plurality of boundary conditions on the thermal network;

identifying a first input power value from the plurality of input power values as a heat source for the thermal network; and determining, at a thermal network solver module, at least a first value of a thermal characteristic of the electronic design for the implementation process at least by analyzing the thermal network with the first input power value and the plurality of boundary conditions.

11. The computer implemented method of claim 10, generating or modifying the electronic design further comprising:

identifying a second input power value from the plurality of input power values as the heat source for the thermal network; and determining, at the thermal network solver module, at least a second value of the thermal characteristic of the electronic design for the implementation process at least by analyzing the thermal network with the second input power value and the plurality of boundary conditions.

12. The computer implemented method of claim 11, generating or modifying the electronic design further comprising:

determining a mapping for the at least one input power profile based in part or in whole upon the first input power value and the second input power value; and determining a derived mapping for the thermal characteristic of the electronic design based in part or in whole upon the mapping for the at least one input power profile, the first value of the thermal characteristic, and the second value of the thermal characteristic.

13. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing electronic designs with thermal analyses of the electronic design and its surrounding medium, the set of acts comprising:

performing thermal modeling that determines at least a thermal RC network for an electronic design;

reducing complexity or state space size of one or more thermal analyses at least by generating, at a thermal network module stored at least partially in memory of and functioning in conjunction with at least a microprocessor of a computing system, a thermal network at least by integrating the thermal RC network for the electronic design with a plurality of equivalent thermal circuit elements representing one or more thermal characteristics or parameters of one or more surrounding media in at least a region surrounding the electronic design; and generating or modifying the electronic design with an implementation process at least by guiding the implementation process based in part or in whole upon results of performing the one or more thermal analysis on the thermal network.

14. The article of manufacture of claim 13, the set of acts further comprising:

generating equivalent thermal circuit elements for the one or more surrounding media at least by performing fluid modeling for the one or more surrounding media; and determining thermal behaviors of the electronic design and thermal interactions between the electronic design and the one or more surrounding media at least by performing the one or more thermal analysis on the thermal network.

15. The article of manufacture of claim 13, the set of acts further comprising:

identifying the thermal RC network of the electronic design into the thermal network;

determining a set of first meshes or elements including a plurality of first nodes for the electronic design at least by discretizing the electronic design with a discretizing scheme; and identifying a plurality of inputs for the thermal modeling, the plurality of inputs comprising at least one of one or more geometric properties, one or more physical properties, one or more thermodynamic properties, one or more boundary conditions, and one or more heat generation sources.

16. The article of manufacture of claim 13, the set of acts further comprising:

identifying a thermal load into the electronic design;

identifying a first thermal load value from the thermal load; and determining thermal solutions for the electronic design with the first thermal load value at least by analyzing one or more heat transfer mechanisms with the thermal RC network for the electronic design.

17. A system for implementing electronic designs with thermal analyses of the electronic design and its surrounding medium, comprising:

at least one processor or at least one processor core that executes a sequence of instructions at least to:

perform thermal modeling that determines at least a thermal RC network for an electronic design;

reduce complexity or state space size of one or more thermal analyses at least by generating, at a thermal network module stored at least partially in memory of and functioning in conjunction with at least a microprocessor of a computing system, a thermal network at least by integrating the thermal RC network for the electronic design with a plurality of equivalent thermal circuit elements representing one or more thermal characteristics or parameters of one or more surrounding media in at least a region surrounding the electronic design; and generate or modifying the electronic design with an implementation process at least by guiding the implementation process based in part or in whole upon results of performing the one or more thermal analysis on the thermal network.

18. The system of claim 17, wherein the at least one processor or at least one processor core is further to:

determining a set of second meshes or elements including a plurality of second nodes for the one or more surrounding medium;

identifying a set of boundary conditions for an interface between the electronic design and the one or more surrounding media;

determining one or more characteristics of a set of the one or more surrounding media at least by analyzing the fluid flow field in the one or more surrounding medium;

identifying a plurality of first meshes or elements corresponding to the interface from the set of first meshes or elements; and identifying a plurality of second meshes or elements corresponding to the interface from the set of second meshes or elements.

19. The system of claim 18, wherein the at least one processor or at least one processor core is further to:

determine equivalent thermal circuit elements for the plurality of second meshes or elements of the one or more surrounding media based in part or in whole upon the one or more characteristics of the one or more surrounding media;

update the thermal network at least by integrating the equivalent thermal circuit elements with the thermal RC network of the electronic design;

identify at least one input power profile comprising a plurality of input power values for the electronic design;

prescribe a plurality of boundary conditions on the thermal network;

identify a first input power value from the plurality of input power values as a heat source for the thermal network; and determine, at a thermal network solver module, at least a first value of a thermal characteristic of the electronic design for the implementation process at least by analyzing the thermal network with the first input power value and the plurality of boundary conditions.

20. The system of claim 19, wherein the at least one processor or at least one processor core is further to:

identify a second input power value from the plurality of input power values as the heat source for the thermal network;

determine, at the thermal network solver module, at least a second value of the thermal characteristic of the electronic design for the implementation process at least by analyzing the thermal network with the second input power value and the plurality of boundary conditions;

determine a mapping for the at least one input power profile based in part or in whole upon the first input power value and the second input power value; and determine a derived mapping for the thermal characteristic of the electronic design based in part or in whole upon the mapping for the at least one input power profile, the first value of the thermal characteristic, and the second value of the thermal characteristic.

* * * * *